US007241220B2

(12) United States Patent
Rothkranz et al.

(10) Patent No.: US 7,241,220 B2
(45) Date of Patent: Jul. 10, 2007

(54) GAMING DEVICE HAVING PIVOTING SYMBOL INDICATOR

(75) Inventors: Markus Rothkranz, Las Vegas, NV (US); Joseph E. Kaminkow, Reno, NV (US); Steve P. McGahn, Reno, NV (US); Gene E. Powell, Reno, NV (US); Randall D. Mead, Reno, NV (US); Joseph R. Hedrick, Reno, NV (US); Karen M. Cregan, Reno, NV (US)

(73) Assignee: IGT, Reno, NV (US)

( * ) Notice: Subject to any disclaimer, the term of this patent is extended or adjusted under 35 U.S.C. 154(b) by 601 days.

(21) Appl. No.: 10/660,401

(22) Filed: Sep. 10, 2003

(65) Prior Publication Data

US 2005/0054424 A1 Mar. 10, 2005

(51) Int. Cl.
*A63F 9/24* (2006.01)
*A63F 9/14* (2006.01)
*G06F 17/00* (2006.01)

(52) U.S. Cl. ............................ 463/20; 463/18; 463/19; 463/67

(58) Field of Classification Search ................... 463/20
See application file for complete search history.

(56) References Cited

U.S. PATENT DOCUMENTS 1,257,045 A * 2/1918 Stotler .................... 273/141 A
2,486,752 A * 11/1949 Michael .................. 273/141 R
2,545,644 A 3/1951 Benton et al.
3,975,022 A 8/1976 Figueroa
4,410,178 A 10/1983 Partridge
4,695,053 A 9/1987 Vazquez, Jr. et al.
4,732,386 A 3/1988 Rayfiel
5,152,529 A 10/1992 Okada
5,364,100 A 11/1994 Ludlow et al.
5,395,111 A 3/1995 Inoue
5,449,173 A 9/1995 Thomas et al.

(Continued)

FOREIGN PATENT DOCUMENTS

GB 912685 12/1962

OTHER PUBLICATIONS

4DU Dice Unit Advertisement written by starpoint.uk.com, printed on Sep. 3, 2002.

(Continued)

*Primary Examiner*—Robert E. Pezzuto
*Assistant Examiner*—Sunit Pandya
(74) *Attorney, Agent, or Firm*—Bell, Boyd & Lloyd LLP

(57) ABSTRACT

A gaming device including a mechanical display which includes a housing, a symbol display mechanism rotatably connected to the housing, a plurality of independent symbol display members including at least one symbol rotatably connected to the symbol display mechanism and a pivoting symbol indicator connected to the center of the symbol display mechanism. Upon a triggering event in a game, the symbol display mechanism rotates relative to the housing and each of the symbol display members rotate relative to the symbol display mechanism. The pivoting symbol indicator pivots downward towards one of the symbol display members to indicate the symbol on the symbol display member. The mechanical display may be used in a primary game, a secondary game or any suitable type of game.

55 Claims, 18 Drawing Sheets

U.S. PATENT DOCUMENTS

| | | | | |
|---|---|---|---|---|
| 5,560,603 | A | 10/1996 | Seelig et al. | |
| 5,584,763 | A | 12/1996 | Kelly et al. | |
| 5,664,998 | A | 9/1997 | Seelig et al. | |
| 5,823,872 | A | 10/1998 | Prather et al. | |
| 5,823,874 | A | 10/1998 | Adams et al. | |
| D400,597 | S | 11/1998 | Hedrick et al. | |
| D402,702 | S | 12/1998 | Seelig et al. | |
| 5,848,932 | A | 12/1998 | Adams | |
| D406,865 | S | 3/1999 | Heidel | |
| 5,882,261 | A | 3/1999 | Adams | |
| 5,911,418 | A | 6/1999 | Adams et al. | |
| 5,927,714 | A | 7/1999 | Kaplan | |
| 5,976,015 | A | 11/1999 | Seelig et al. | |
| 6,004,207 | A | 12/1999 | Wilson, Jr. et al. | |
| 6,059,658 | A | 5/2000 | Mangano et al. | |
| 6,086,066 | A | 7/2000 | Takeuchi et al. | |
| 6,089,977 | A | 7/2000 | Bennett | |
| 6,089,978 | A | 7/2000 | Adams et al. | |
| 6,105,962 | A | 8/2000 | Malavazos et al. | |
| 6,113,098 | A | 9/2000 | Adams | |
| 6,142,873 | A | 11/2000 | Weiss et al. | |
| 6,142,874 | A | 11/2000 | Kodachi et al. | |
| 6,159,098 | A | 12/2000 | Slomiany et al. | |
| 6,162,121 | A | 12/2000 | Morro et al. | |
| 6,173,955 | B1 | 1/2001 | Perrie et al. | |
| 6,203,429 | B1 | 3/2001 | Demar et al. | |
| D441,031 | S | 4/2001 | Seelig et al. | |
| 6,213,876 | B1 | 4/2001 | Moore, Jr. | |
| 6,220,593 | B1 | 4/2001 | Pierce et al. | |
| 6,224,483 | B1 | 5/2001 | Mayeroff | |
| 6,227,970 | B1 | 5/2001 | Shimizu et al. | |
| D443,313 | S | 6/2001 | Brettschneider | |
| 6,251,013 | B1 | 6/2001 | Bennett | |
| 6,254,481 | B1 | 7/2001 | Jaffe | |
| 6,267,669 | B1 | 7/2001 | Luciano, Jr. et al. | |
| 6,270,411 | B1 | 8/2001 | Gura et al. | |
| 6,302,790 | B1 | 10/2001 | Brossard | |
| 6,305,686 | B1 | 10/2001 | Perrie et al. | |
| 6,315,663 | B1 | 11/2001 | Sakamoto | |
| 6,336,863 | B1 * | 1/2002 | Baerlocher et al. | 463/27 |
| 6,340,158 | B2 | 1/2002 | Pierce et al. | |
| 6,368,216 | B1 | 4/2002 | Hedrick et al. | |
| 6,386,974 | B1 | 5/2002 | Adams | |
| 6,398,220 | B1 * | 6/2002 | Inoue | 273/142 R |
| 6,419,579 | B1 | 7/2002 | Bennett et al. | |
| 6,461,241 | B1 | 10/2002 | Webb et al. | |
| D465,531 | S | 11/2002 | Luciano, Jr. et al. | |
| 6,481,713 | B2 | 11/2002 | Perrie et al. | |
| 6,533,273 | B2 * | 3/2003 | Cole et al. | 273/138.1 |
| 6,533,660 | B2 | 3/2003 | Seelig et al. | |
| 6,537,152 | B2 | 3/2003 | Seelig et al. | |
| 6,582,307 | B2 | 6/2003 | Webb | |
| 6,609,972 | B2 | 8/2003 | Seelig et al. | |
| 6,712,694 | B1 * | 3/2004 | Nordman | 463/20 |
| 6,715,756 | B2 * | 4/2004 | Inoue | 273/143 R |
| 6,758,473 | B2 * | 7/2004 | Seelig et al. | 273/143 R |
| 6,793,577 | B1 * | 9/2004 | Wilkins et al. | 463/16 |
| 6,855,056 | B2 * | 2/2005 | Inoue | 463/31 |
| 6,905,406 | B2 * | 6/2005 | Kaminkow et al. | 463/20 |
| 6,905,407 | B2 * | 6/2005 | Nordman | 463/20 |
| 6,939,225 | B2 * | 9/2005 | Kaminkow | 463/16 |
| 2004/0147306 | A1 * | 7/2004 | Randall et al. | 463/20 |
| 2005/0026678 | A1 * | 2/2005 | Kaminkow | 463/20 |
| 2005/0054428 | A1 * | 3/2005 | Nordman et al. | 463/25 |
| 2005/0056996 | A1 * | 3/2005 | Nordman | 273/143 R |
| 2005/0101371 | A1 * | 5/2005 | Seelig et al. | 463/20 |
| 2006/0009278 | A1 * | 1/2006 | Vancura | 463/25 |

OTHER PUBLICATIONS

American Bandstand Brochure written by Anchor Games, published in 2001.

Big Shot!™ Advertisement published by Aristocrat Technologies, Inc., published in 2000.

Big Top Keno Advertsiement published by Aristocrat Technologies, Inc., published in 2000.

Bonus Roulette Brochure written by F. Franco, not dated.

Buck's Roulette Brochure written by R. Franco, not dated.

Chariot's of Fortune Brochure written by R. Franco, not dated.

Classic Pot of Gold Brochure written by Ace Coin Equipment Ltd., not dated.

Cyberdyne Gaming Brochure written by Cyberdyne Gaming, not dated.

Elvira® Mistress of the Dark™ Advertisement written IGT, published in 2002.

Elvis Hits Advertisement written by IGT, published in 1999.

Holy Smoke Brochure written by Impulse Gaming Ltd., not dated.

Jack and the Beanstalk™ Brochure written by AC Coin & Slot, not dated.

King of the Grill™ Brochure written by AC Coin & Slot, not dated.

Line-Up Brochure written by AC Coin & Slot, not dated.

Little Green Men Jr.™ Advertisement written by AC Coin & Slot, not dated.

Little Green Men Jr.™ Article written by Strictly Slots, published in Feb. 2003.

Miss America Brochure written by AC Coin & Slot, not dated.

Mix and Match Article written by Strictly Slots, published in Apr. 2002.

Mix and Match Advertisement published by AC Coin & Slot, not dated.

Money Grab Article written by Strictly Slots, published in Apr. 2001.

Monster Match Article written by Strictly Slots, published in Jan. 2002.

On The Money! Article written by Strictly Slots, published in Dec. 2000.

Payout!™ Advertisement written by www.csds.com/Gaming/Products/g Payout.htm, printed on Jan. 15, 2001.

Payout!™ Article written by Casino Data Systems, not dated.

Pick a Prize Brochure written by Acres Gaming Incorporated, published prior 2001.

Power Slotto Brochure published by AC Coin & Slot prior to 2002.

Press Your Luck Brochure published by AC Coin & Slot prior to 2002.

Quick Pick Paytime Brochure written by Acres Gaming Incorporated, published prior to 2001.

R&B™ Brochure published by AC Coin & Slot, not dated.

Reel Dice Advertisement written by Gerber & Glass, published in 1936.

Royal Roulette Brochure written by Impulse Gaming Ltd., not dated.

Slot Machine Buyer's Handbook, A Consumer's Guide to Slot Machines written by David L. Saul and Daniel R. Mead, published in 1998.

Silver City Roundup Brochure published by AC Coin & Slot, not dated.

Slot Machines A Pictorial History of the First 100 Years, 5th edition written by Marshall Fey, published in 1983-1997.

Slot Machines on Parade, 1st edition written by Robert N. Geddes and illustrated by Daniel R. Mead, published in 1980.

Spin-A-Lot Brochure written by Acres Gaming Incorporated, published prior to 2001.

Take Your Pick Article written by Strictly Slots, published in Mar. 2001.

Yahtzee Bonus Advertisement written by Mikohn, published in 1999.

* cited by examiner

GAMING DEVICE HAVING PIVOTING SYMBOL INDICATOR

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming device manufacturers strive to make wagering gaming devices that provide as much enjoyment, entertainment and excitement as possible for players. Providing interesting and exciting primary or base games and secondary or bonus games in which a player has an opportunity to win potentially large awards or credits is one way to enhance player enjoyment and excitement. Another way to enhance a player's enjoyment, entertainment and excitement with a gaming device is by including lights, sounds and other visual or audio or audio-visual effects in the gaming machines.

Certain known gaming devices use mechanical devices such as reels or wheels to enhance the attraction of the machines to players and also to enhance the player's game playing experience. These mechanical devices enable a player to see physical movements of a game, a portion of a game, or a functional game event or element which increases the player's enjoyment of the game.

To increase player enjoyment and excitement, it is desirable to provide new and different mechanical devices which operate in conjunction with primary or secondary games of wagering gaming devices.

SUMMARY OF THE INVENTION

One embodiment of the present invention is directed to a gaming device having a mechanical display or mechanical topper unit including a housing, a movable symbol display mechanism connected to the housing including a plurality of symbol display members each movably connected to the symbol display mechanism and a pivoting symbol indicator which pivots to indicate one of the symbols on one of the symbol display members.

In one embodiment, the housing is attached to the top of the cabinet of the gaming device using suitable connectors where at least a portion of the housing includes a transparent or substantially transparent or see-through material to enable a player to view the components inside the housing. In another embodiment, the housing is separate from the gaming device cabinet such as in a display above the cabinet of the gaming device or in a bank of gaming devices, and associated with or activated upon a triggering event in the gaming device.

In one embodiment, the symbol display mechanism is rotatably attached to the housing and is operable to move or rotate relative to the housing. In one such embodiment, the symbol display mechanism includes a rotatable base plate and a plate support that fits into and is rotatably connected to a corresponding receptacle in the bottom of the housing. An actuator such as a suitable motor is coupled with the support to cause the support to rotate relative to the housing. The rotation of the base or support causes the plate to rotate relative to the housing.

In one embodiment, the plurality of symbol display members are each independently rotatably attached to the symbol display mechanism. In one embodiment, each symbol display member includes at least one symbol. The symbol may represent an outcome such as an award, a value, a modifier such as a multiplier, a game element or any suitable outcome. In addition, two of the symbols, a plurality of the symbols or all of the symbols on the symbol display members may be different.

In one embodiment, the pivoting symbol indicator is positioned and mounted in the center of the symbol display and includes an indicator member having a pointer, a pivot member connected to the indicator member and a body connected to the pivot member. The indicator member and specifically the pivot member, defines a hole or opening that extends transversely (such as horizontally) through the pivot member. In one such embodiment, an axle is mounted in the hole such that at least a portion of the axle extends from each side of the pivot member. The indicator member is positioned between two vertical spaced-apart supports connected to an assembly plate, which in turn is connected to the bottom of the housing. Each end of the axle is rotatably connected to one of the vertical supports. The axle thereby enables the pivot member and thereby the indicator member to pivot forward and backward about the axle to indicate a symbol on one of the symbol display members.

In one embodiment, at least one of the symbol display members includes an illumination device. When the pivoting symbol indicator indicates one of the symbols on the illuminated symbol display member, the gaming device provides an outcome such as a bonus award or any other suitable type of award to the player based on the illuminated symbol indicated on the symbol display member. In another embodiment, a plurality of the symbol display members each include an illumination device. In a further embodiment, all of the symbol display members each include an illumination device. In one aspect of this embodiment, the symbol display member including the symbol indicated by the pivoting symbol indicator is illuminated or highlighted when the symbol indicator pivots and indicates the symbol on that symbol indicator. In another aspect, all of the symbol indicators are initially highlighted or illuminated and the symbol display member including the indicated symbol becomes non-illuminated when the symbol indicator pivots and indicates a symbol on that symbol display member.

In one embodiment, the symbol indicator, symbol display members and the other components in the gaming device are based on a theme associated with the gaming device. It should be appreciated that the symbol display members, the pivoting symbol indicator and the other components of the gaming device may thus be any suitable size and shape and may be based on any suitable theme. It should also be appreciated that the mechanical display of the present invention may be employed in a primary game, a secondary game, in any other suitable game or in an attract, award or any other mode.

In one embodiment, the symbol display members each include at least two symbols having values modifiers such as, multipliers or a value and a modifier such as a multiplier. In one embodiment, at least one of the symbols on the symbol display members includes a multiplier. In one game, the pivoting symbol indicator indicates symbols on the symbol display members until a non-multiplier value is indicated on one of the symbol display members. The gaming device accumulates any multipliers indicated by the symbol indicator on the symbol display members until the non-multiplier value is indicated in the game. The indicated non-multiplier value is then multiplied by the accumulated multiplier to provide a total award to the player in the game. In one embodiment, the gaming device provides a predetermined or designated award to the player when the player accumulates a designated total multiplier value before obtaining a non-multiplier value in the game.

It is therefore an advantage of the present invention to provide a gaming device, which includes a mechanical display.

Additional features and advantages of the present invention are described in, and will be apparent from, the following Detailed Description of the Invention and the figures.

DETAILED DESCRIPTION OF THE INVENTION

Gaming Device and Electronics

Figure 1:
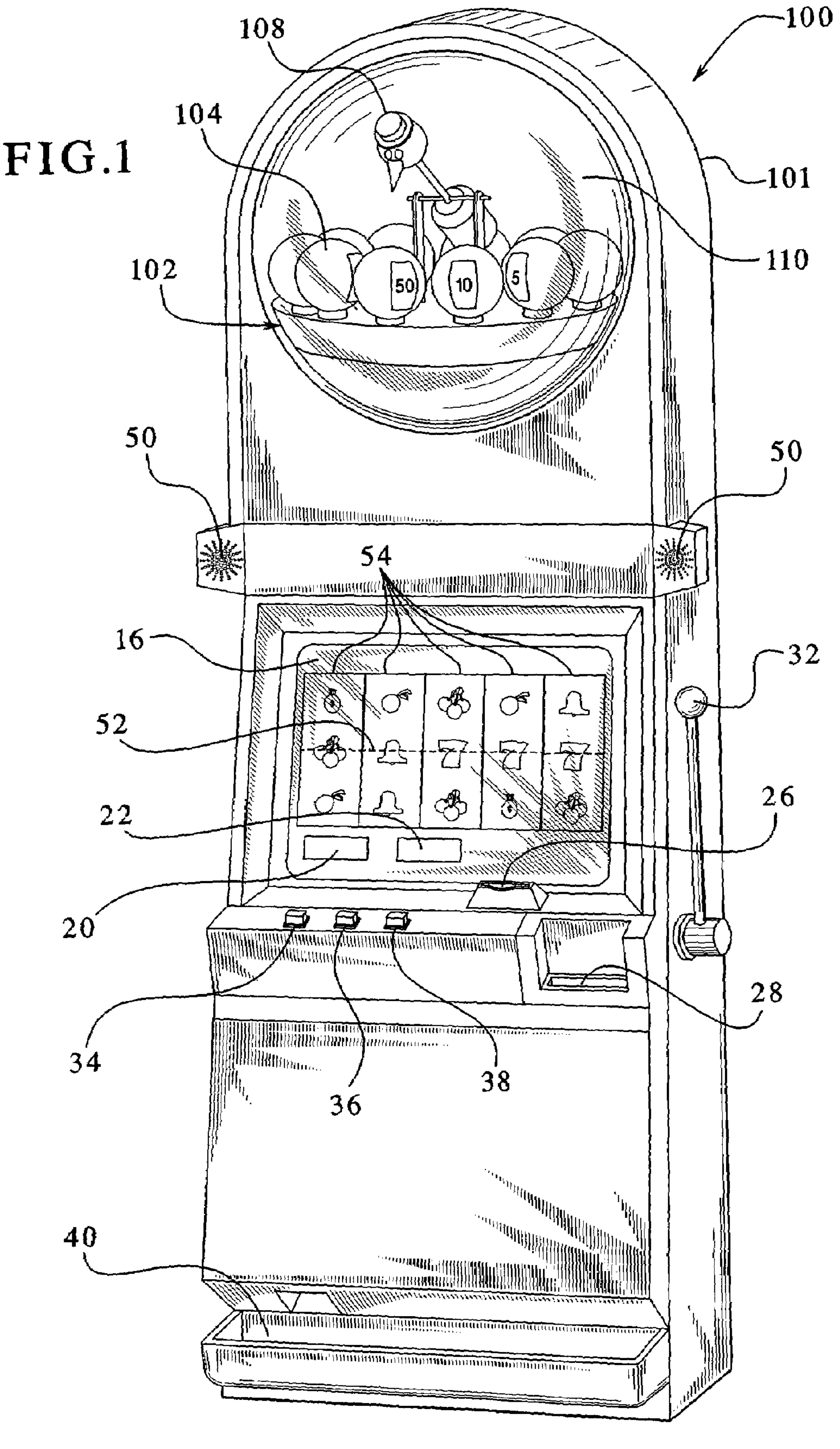
FIG. 1 is a front perspective view of the mechanical display device of one embodiment of the gaming device of the present invention.

Referring now to the drawings, one embodiment of the gaming device of the present invention is illustrated in FIG. 1 as gaming device 10. As illustrated in FIG. 1, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sifting. As illustrated by the different configurations shown in FIG. 1, the gaming device can be constructed with varying cabinet and display configurations.

Figure 2A:
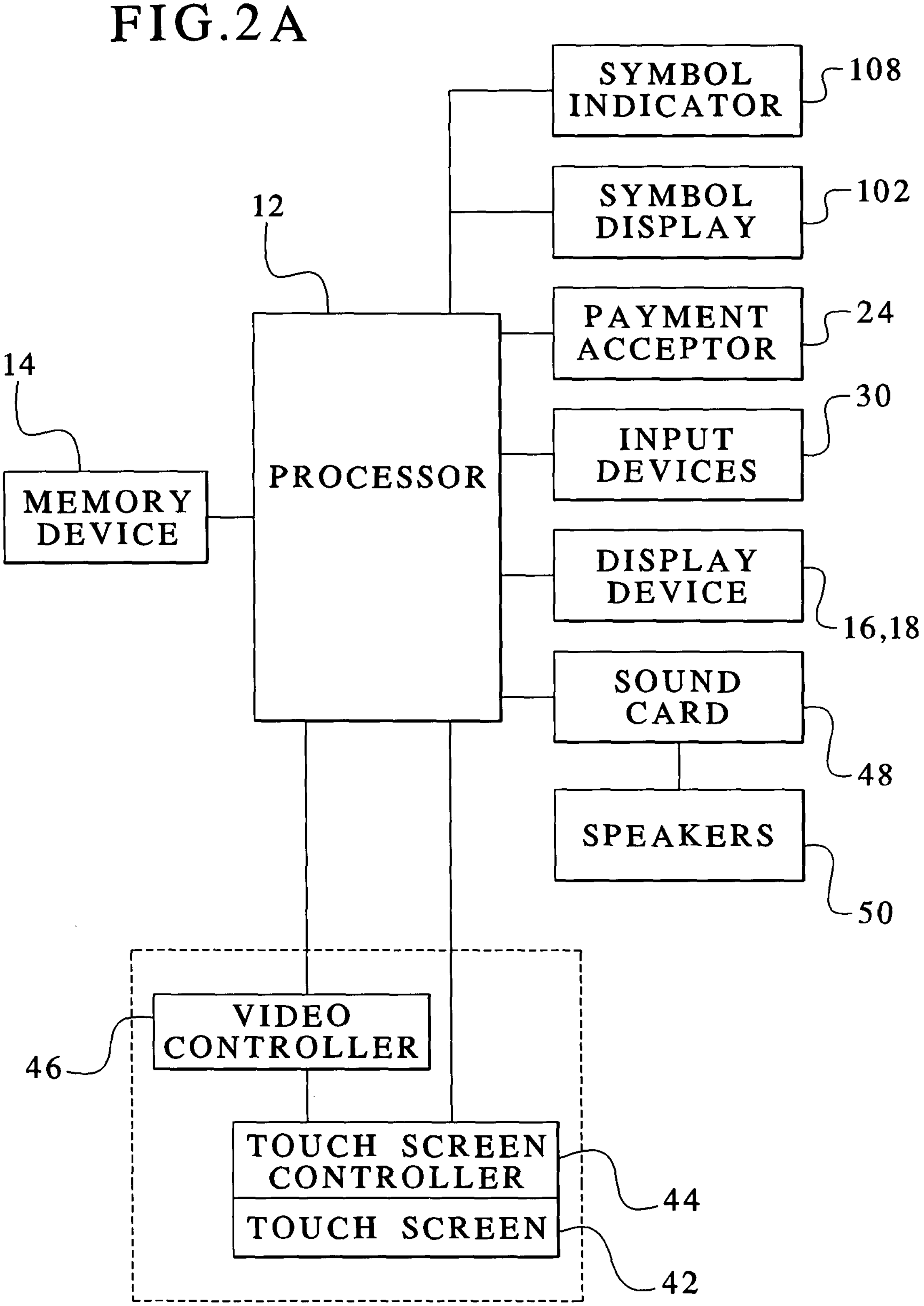
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes at least one display device controlled by the processor. The display device is preferably connected to or mounted to the cabinet of the gaming device. The embodiment shown in FIG. 1 includes a central display device 16 which displays a primary game. This display device may also display any secondary game associated with the primary game as well as information relating to the primary or secondary game. The gaming device also includes a secondary display 100, which is mounted to or connected to the top of the cabinet of the gaming device. The secondary display 100 includes a moveable symbol display mechanism 102 and a moveable symbol indicator 108, which are controlled by the processor 12. Additionally, as seen in FIG. 1, in one embodiment, gaming device 10 includes a credit display 20 which displays a player's current number of credits, cash, account balance or the equivalent. In one embodiment, gaming device includes a bet display 22 which displays a player's amount wagered.

The display device may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display device may be of any suitable configuration, such as a square, rectangle, elongated rectangle.

The display device of the gaming device is configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

As illustrated in FIG. 2A, in one embodiment, the gaming device includes at least one payment acceptor 24 in communication with the processor. As seen in FIG. 1, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1 and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIG. 1, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Gaming device 10 can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, as illustrated in FIG. 1, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, the plurality of simulated video reels 54 are displayed on one or more of the display devices as described above. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning pattern.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIG. 1. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Figure 2B:
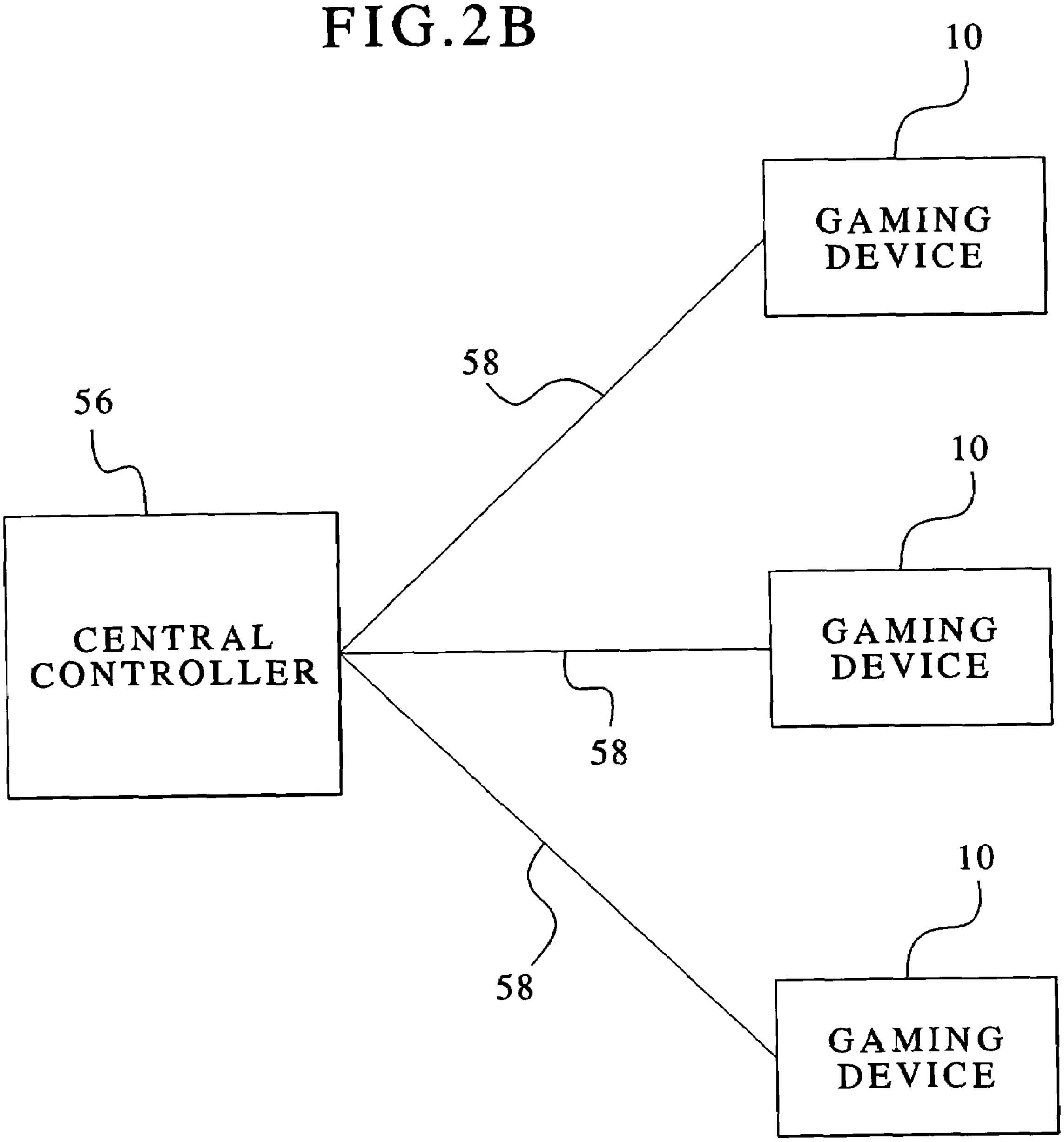
FIG. 2B is a schematic block diagram illustrating a plurality of gaming terminals and communication with a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Pivoting Symbol Indicator Mechanical Display

Referring back to FIG. 1, one embodiment of the present invention is directed to a gaming device having a secondary display such as a mechanical display or mechanical topper unit 100 including a housing 101 connected to the top of the cabinet of the gaming device 10 and a movable symbol display mechanism 102 including a plurality of symbol display members 104 where each symbol display member is movably connected to the symbol display mechanism. In one embodiment, each of the symbol display members 104 includes at least one outcome or symbol. The gaming device further includes a movable or pivotable symbol indicator 108 which is operable to move or pivot towards (and away from) one of the symbol display members to indicate the symbol on the symbol display member in a game. It should be appreciated that the mechanical display device 100 may be employed as part of a primary or base game, a secondary or bonus game, or as part of any suitable game, attract mode or other suitable use.

As described above, in one embodiment, the housing 101 is secured or attached to the top or upper portion of the cabinet of the gaming device 10. It should be appreciated that the housing 101 may be a separate display device which is not attached to the cabinet, such as a display device above a gaming device or a bank of gaming devices associated with or activated upon a triggering event in a gaming device.

In one embodiment, at least a portion of the housing includes a viewable section or viewable area 110 which includes a transparent material or a substantially transparent or see-through material which enables a player to view the symbol display mechanism 102 and the pivoting symbol indicator 108 connected to the housing. The transparent material may include glass, plastic or any suitable transparent or substantially transparent or see-through material.

Referring now to FIGS. 3A to 3F, 4A and 4B, in one embodiment, the symbol display mechanism 102 includes a moveable plate assembly 112, a gear assembly 123 which is removably connected to the moveable plate assembly 112 and a plurality of display members 104, which are movable connected to the plate assembly 112. In one embodiment, the moveable plate assembly 112 includes a moveable base plate 113*a*, a circuit board plate 113*b* mounted to the base plate 113*a*, a slip disk 113*c* mounted to the circuit board plate 113*b*, and a gear support plate 113*d* mounted on the circuit board plate 113*b*.

In one embodiment, the moveable base plate 113*a* is in the shape of a circular disc and is manufactured using a durable material such as stainless steel or other suitable metal. It should be appreciated that the base plate may be manufactured using any suitable material. The base plate 113*a* also includes a plate support 114 extending generally downward from the base plate. In one embodiment, the plate support 114 is connected to a plate flange 116 which is connected to the moveable plate 113*a*. The plate flange 116 adds further stability to the attachment between the plate support and the plate. In another embodiment, the plate support 114 is integrally formed with the plate 112.

In one embodiment, the plate support 114 is inserted into and is rotatably connected to the housing 101 and rotates or moves relative to the housing. An actuator, such as an electric motor, stepper motor or any other suitable motor or the like (not shown) is coupled with an end of the plate support 114 (the end opposite to the end connected to the symbol display mechanism). The actuator is operable to move or rotate the plate support and thereby move or rotate the base plate 113*a* in a clockwise direction, a counterclockwise direction or in any suitable combination of directions. In one embodiment, the moveable base plate 113*a* defines a plurality of wire openings 139 which enables electrical connections to be made between the different components of the moveable plate assembly 112 as described below.

Figure 3A:
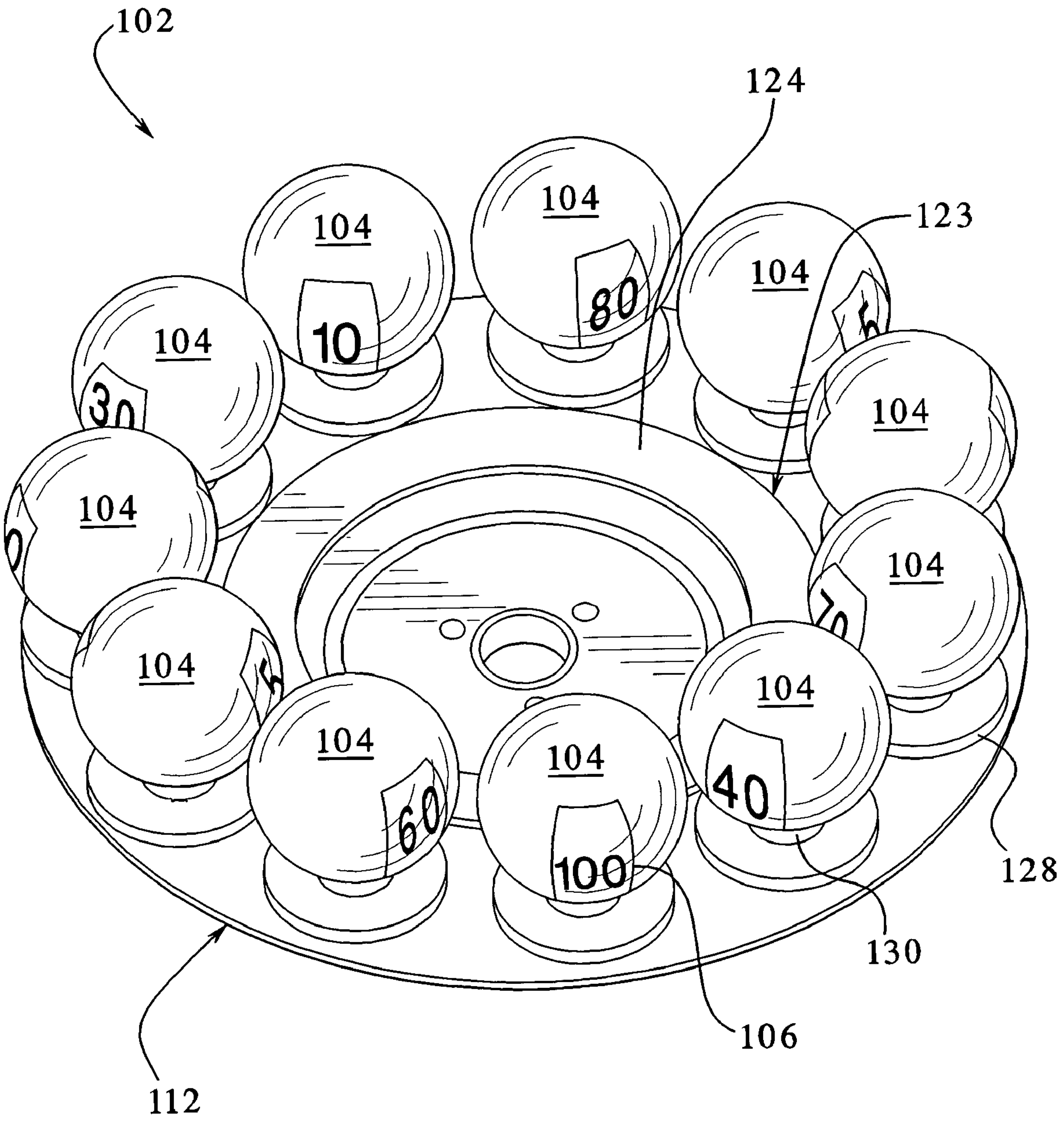
FIG. 3A is an enlarged perspective view of the symbol display mechanism shown in the embodiment of FIG. 1.
Figure 3B:
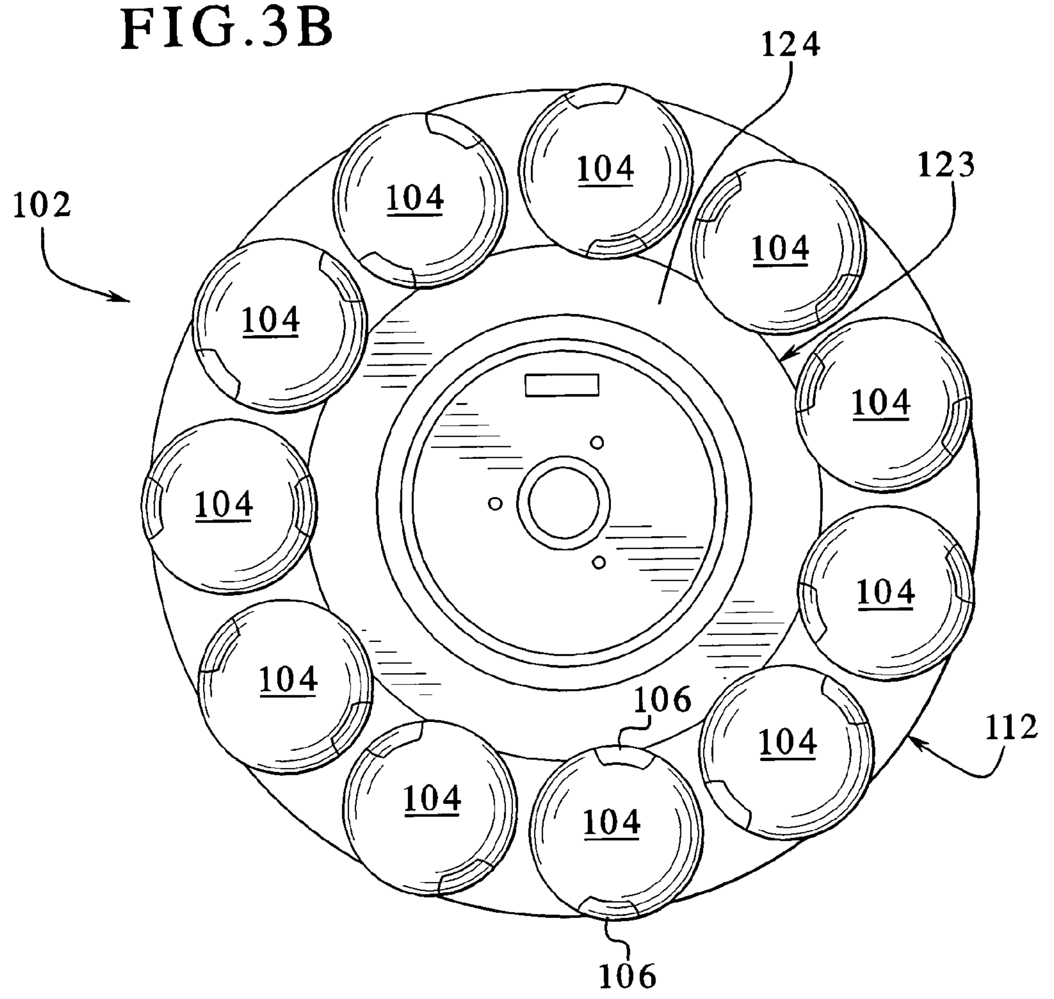
FIG. 3B is a top plan view of the symbol display mechanism shown in the embodiment of FIG. 1.
Figure 3C:
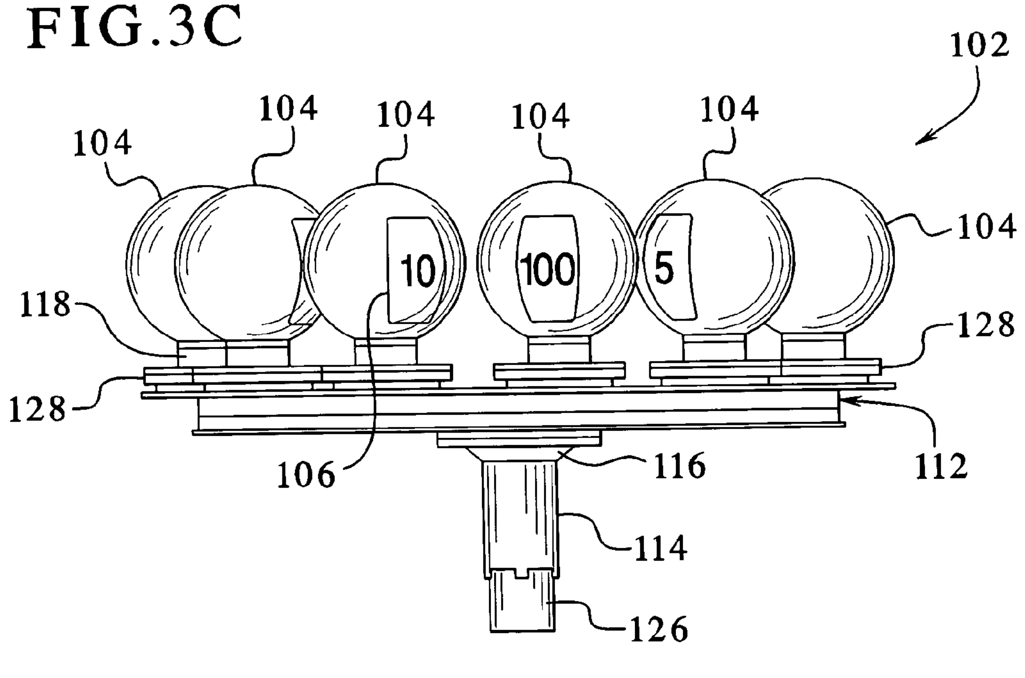
FIG. 3C is a side view of the symbol display mechanism shown in the embodiment of FIG. 1.
Figure 3D:
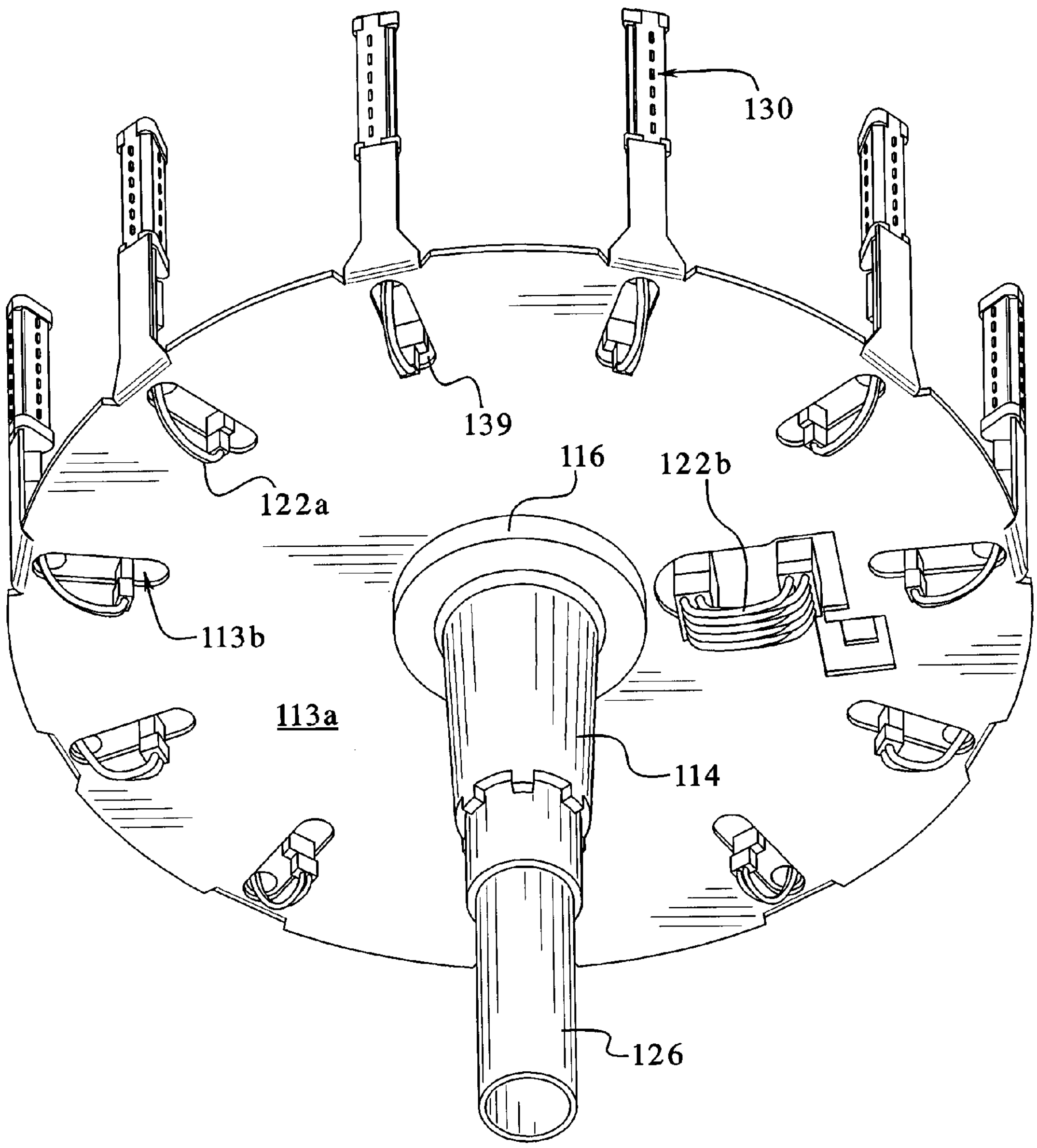
FIG. 3D is an enlarged side perspective view of the base plate of the symbol display mechanism shown in FIG. 3C.
Figure 3E:
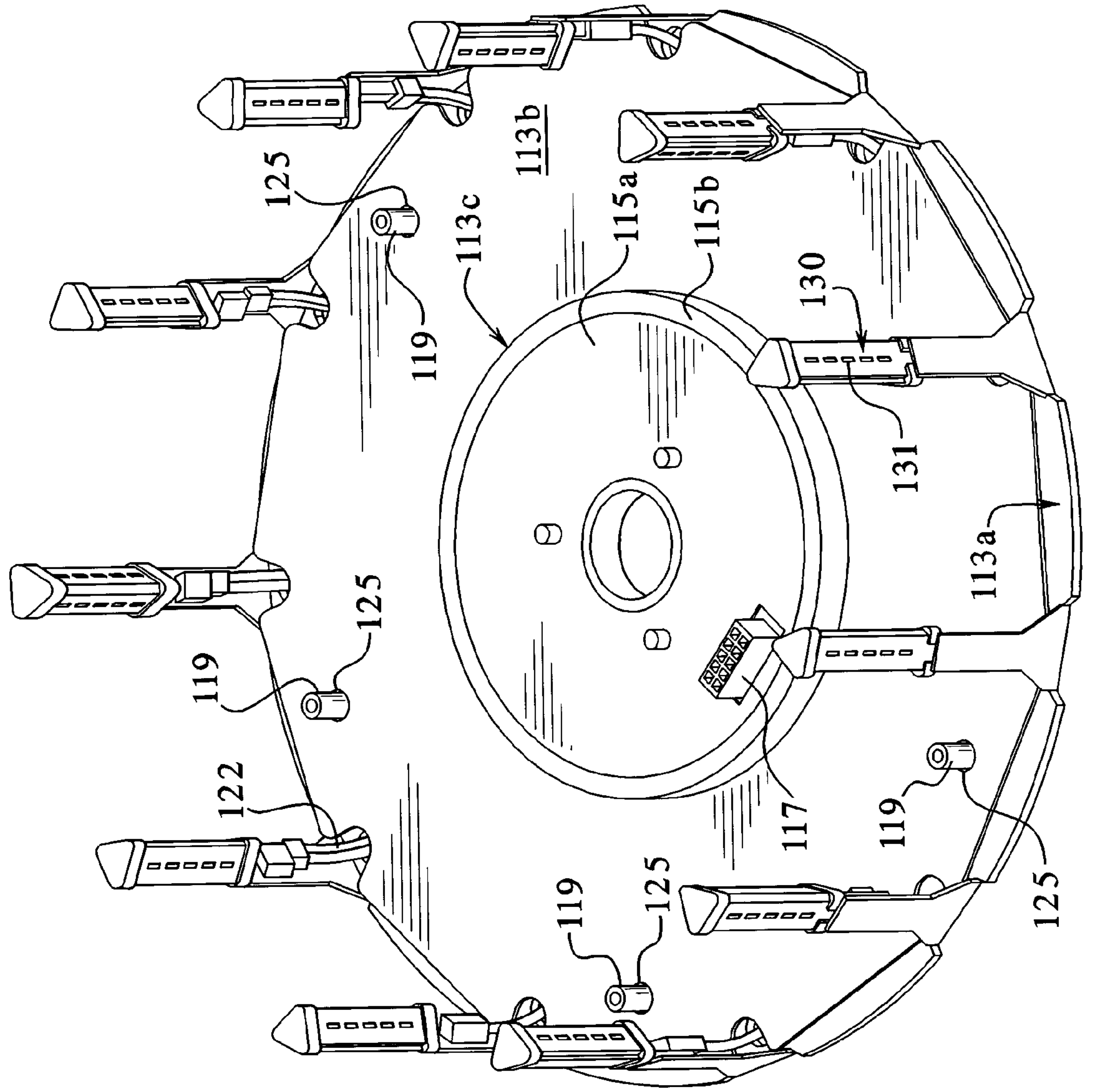
FIG. 3E is an enlarged top perspective view of the base plate of FIG. 3D.

Referring to FIGS. 3D and 3E, in one embodiment, a circuit board plate 113*b* is mounted on the top side or surface of the base plate 113*a*. The circuit board plate is a ring-shaped or annular plate that defines several openings 125 that receive alignment members 119, which are attached to the base plate 113*a*. The alignment members 119 maintain the position of the circuit board plate 113*b* on the base plate 113*a* and prevent the circuit board plate 113*b* from moving out of position. The circuit board plate 113*b* also includes a plurality of wiring mechanisms or wiring harnesses 122*a*, which each connect at one end to the circuit board plate 113*b* and at the other end to one of the display member supports 130. The circuit board plate 113*b* transfers or communicates electrical signals from the processor 38 to each of the display member supports 130. The circuit board plate 113*b* also includes a wiring mechanism or harness 122*b* which is connected to the circuit board plate 113*b* at one end and to a slip disk 113*c* at a second end. The wiring harness 122*b* transfers electrical signals from the processor to the slip disk 113*c* and in turn, to each of the display member supports 130 as described below.

In one embodiment, the plate assembly 112 includes a slip disk 113*c*, which is positioned in the center of the circuit board plate 113*b* and is mounted to the top end of the first gear support 126. Specifically, the slip disk 113*c* includes a fixed or stationary slip disk member 115*a* and a moveable slip disk member 115*b*. The fixed slip disk member 115*a* is connected or attached to the top end of the first gear support 126. Therefore, the fixed slip disk member 115*a* remains stationary during the movement of the base plate 113*a*. The moveable slip disk member 115*b* is positioned adjacent to the fixed slip disk member 115*a* and rotates or moves with respect to the fixed slip disk member 115*a*. In one embodiment, the moveable slip disk member 115*b* is connected or mounted to the base plate 113*a* using suitable connectors. The moveable slip disk member 115*b* therefore moves in sync with or in accordance with the movement of the base plate 113*a*.

Figure 3F:
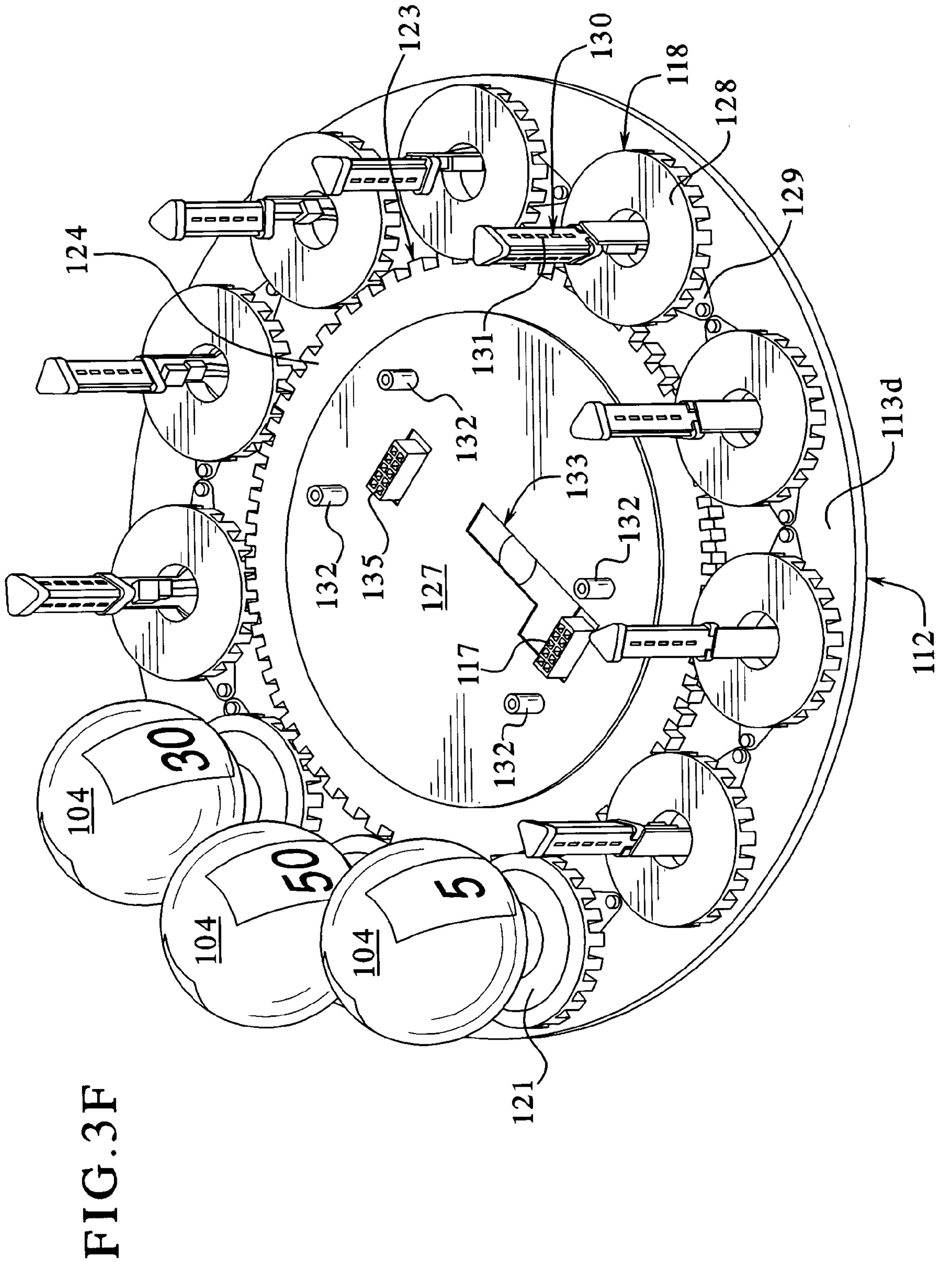
FIG. 3F is an enlarged top perspective view of the symbol display mechanism of FIG. 3A where some of the symbol display members are removed from the symbol display.
Figure 4A:
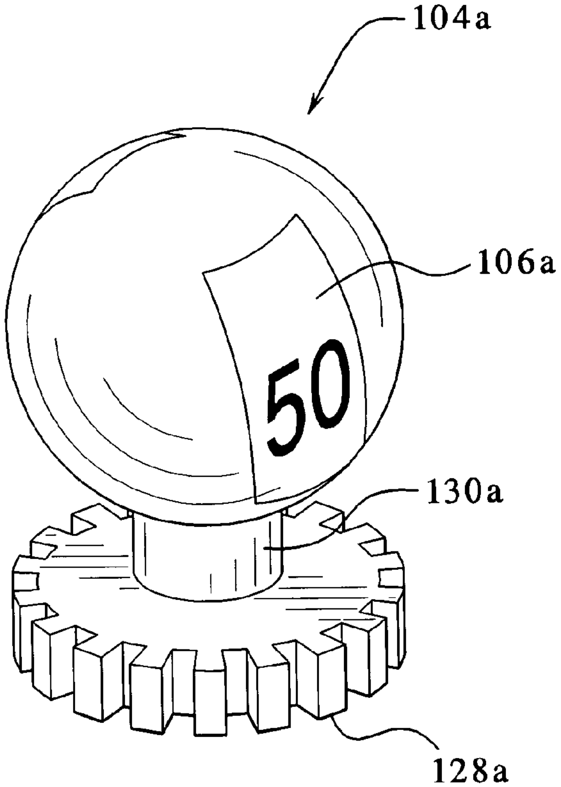
FIG. 4A is an enlarged perspective view of one embodiment of a symbol display member including two symbols.
Figure 4B:
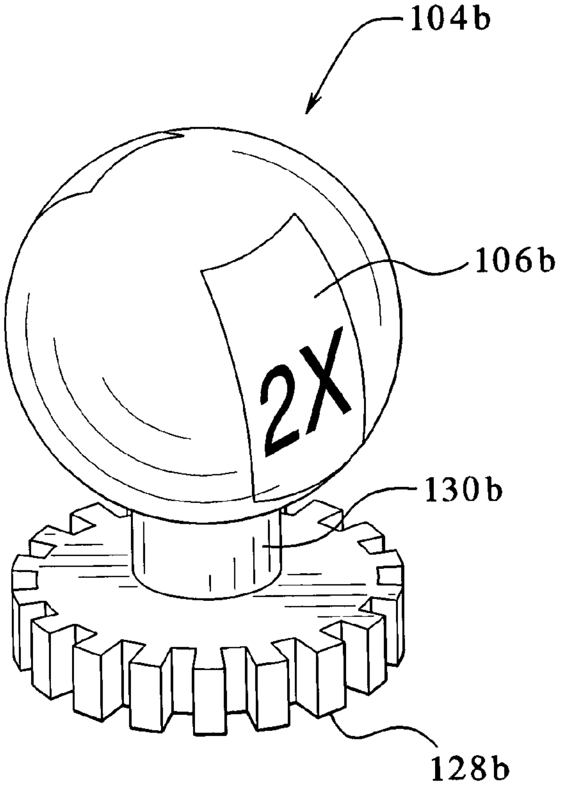
FIG. 4B is an enlarged perspective view of another embodiment of a symbol display member having symbols which are multipliers.

In one embodiment, suitable electrical wiring is connected to the processor at one end. The opposite end of the wiring is inserted into and through the center of the first gear support 126 and is connected to the main wire connector 117 of the fixed slip disk member 115*a* as shown in FIG. 3F. In one embodiment, the fixed slip disk member 115*a* includes a plurality of electrical connectors or electrical contacts (not shown) on the bottom side of the fixed slip disk member which electrically contact similar electrical contacts on the top surface or side (not shown) of the moveable slip disk member 115*b*. The slip disk 113*c* thereby enables electrical signals from the processor to be transferred or communicated to the slip disk and specifically to the fixed slip disk member 115*a* when the base plate 113*a*, circuit board plate 113*b* and moveable slip disk member 115*b* are moving or rotating.

Referring to FIG. 3F, in one embodiment, gear support plate 113*d* includes a plurality of openings (not shown) which are spaced to correspond to the locations of the display member supports 130 on the base plate 113*a*. The openings on the gear support plate 113*d* are positioned over the display member supports 130, which are inserted through the openings in the gear support plate, to enable the gear support plate to be mounted to the base plate 113*a* using suitable connectors or fasteners. In one embodiment, the gear support plate 113*d* is manufactured using stainless steel or any other suitable metal. It should be appreciated that the gear support plate 113*d* may be manufactured using any suitable material or materials. The gear support plate 113*d* supports the display member rotation mechanisms 118 and rotates in unison with the base plate 113*a*, the circuit board plate 113*b* and the moveable slip disk member 115*b*.

In one embodiment, the first gear assembly 123 is positioned on and mounted to the top surface of the fixed slip disk member 115*a*. The first gear assembly includes a first gear 124, a first gear support 126 which is attached to the first gear and extends generally downward from the bottom of the first gear, and a cover plate 127 which is mounted to the top of the first gear 124. In one embodiment, the first gear 124 has an annular or ring-shape and includes a plurality of teeth defined on the outside or outer surface of the first gear as shown in FIG. 3F. The first gear 124 further includes four symbol indicator posts 132 for fixedly connecting the pivoting symbol indicator 108 to the top surface of the first gear, as described below. Additionally, the first gear 124 includes an electrical connector or electrical harness 135, which is connected to electrical wiring extending through the first gear support 126 from the processor 38. The electrical wiring transfers or communicates electrical signals from the processor to the electrical connector 135, which in turn, transfers the signals to the pivoting symbol indicator 108 through suitable electrical wiring.

In one embodiment, the cover plate 127 connects or mounts to the top surface of the fixed slip disk member 115*a* using suitable connectors. The cover plate partially covers the first gear 124 and defines an opening 133 which enables the main wire connector 117 to extend through the opening and connect to the wiring from the processor.

In one embodiment, the first gear support 126 is connected to the housing 101 and thereby fixedly secures the first gear to the housing. Because the first gear 124 is stationary, the first gear does not move or rotate when the base plate 113*a*, circuit board plate 113*b* and moveable slip disk member 113*c* move or rotate. In one embodiment, the first gear support 126 is a generally cylindrically shaped support attached to and extending generally downward from the first gear 124. The first gear support 126 includes a diameter which is smaller than the diameter of the plate support 114. This enables the first gear support 126 and thereby the first gear assembly 123 to be inserted into the opening beginning on the top side of the base plate 113*a* and inserted down through the opening until the bottom of the first gear 124 fits in a correspondingly shaped recessed area formed on the top surface of the base plate 113*a*. Specifically, as shown in FIG. 3D, the first gear support 126 is sized so that the first gear support fits into and through the plate support 114. Additionally, the diameter of the first gear support 126 is less than the diameter of the plate support 114 so that the plate support 126 freely rotates about the first gear support 126.

Once the first gear assembly 123 is positioned or connected to the housing, the symbol display mechanism 102 is connected to the housing 101. In one embodiment, the first gear support 126 of the symbol display mechanism 102 is connected to the housing 101 so that the first gear support is stationary or otherwise does not rotate or move relative to the housing. The plate support 114 is coupled with an actuator such as a suitable electric motor or stepper motor (not shown). In one embodiment, the actuator or motor is coupled with an end of the plate support 114 (the end opposite to the end connected to the symbol display mechanism). The motor is activated by the processor and is operable to move or rotate the plate support and thereby move or rotate the base plate 113*a*. Once assembled, the first gear assembly 123 remains stationary while the base plate 113*a* moves or rotates relative to the first gear assembly.

In one embodiment, the plurality of symbol display members 104 are moveably connected to and generally extend from the top surface of the plate assembly 112. Specifically, in one embodiment, the symbol display members 104 are each connected to a rotation mechanism 118, which is rotatably connected to the gear support plate 113*d*. The rotation mechanisms 118 each include a second gear 128 and a second gear base 129. Each of the display member supports 130, which are fixedly attached to the base plate 113*a*, extend upward though an opening in the approximate center or center portion of each of the second gears 128. Then, the second gear base 129 of each of the rotation mechanisms 118 is secured to the gear support plate 113*d* using suitable connectors or fasteners as shown in FIG. 3F. The rotations mechanisms 118 enable each of the symbol display members 104 to move or rotate with respect to the moving base plate 113*a* as described below.

In one embodiment, each of the symbol display members 104 includes an opening (not shown) which extends from the bottom of the symbol display member upward into the symbol display member. The opening does not extend all the way through the symbol display member. The opening in each of the symbol display members 104 is shaped to correspond to the shape of the display member supports 130. In one embodiment, the opening on each of the symbol display members is positioned over each of the display member supports 130 on each of the rotation mechanisms 118. The display member supports 130 are then inserted upward into the opening of each of the symbol display members 104. The symbol display members 104 each include a connector flange 121 which is suitably secured to the top surface of the second gears 128 of the rotation mechanisms 118. In another embodiment, the rotation mechanisms 118 are integrally formed with the symbol display members 104.

In one embodiment, the second gears 128 each include an outer surface having a plurality of teeth which correspond to and mesh with the teeth on the outer surface of the first gear 124. As shown in FIG. 3F, the rotation mechanisms 118 are spaced apart or positioned on the gear support plate 113*d* so that each of the symbol display members 104 freely and independently rotate relative to the moving base plate 113*a*. Once connected to the gear support plate 113*d*, each of the rotation mechanisms 118 independently rotate the symbol display members 104. Specifically, as the base plate 113*a*, circuit board plate 113*b* and moveable slip disk member 115*b* simultaneously rotate relative to the stationary first gear 124. The teeth on each of the second gears 128 mesh with the teeth on the stationary first gear 124 to cause the second gears to rotate the symbol display numbers 124 in the opposite direction from the direction of the rotation of the base plate 113*a*, circuit board plate 113*b* and moveable slip disk member 115*b*.

In one embodiment, the first gear 124, and each of the second gears 128, are sized so that the second gears and the corresponding symbol display members rotate a desired number of revolutions relative to the number of revolutions of the base plate 113*a*. In one embodiment, each of the second gears 128 are sized so that the ratio of the number of revolutions of each of the second gears to the number of revolutions of the first gear 124 is greater than 1:1. In another embodiment, the ratio is 3.5:1. In this embodiment, the symbol 106 on each of the symbol display members 104 is positioned to enable the symbol to rotate and be visible or viewable by the player (in front of the gaming device) when the symbol display member is positioned adjacent to the transparent section or see-through portion of the housing 101. It should be appreciated that the first and second gears may be any suitable size or shape to achieve any desired ratio or number of revolutions of the first and/or second gears.

In one embodiment, at least one of the display member supports 130 includes an illumination device (not shown) which illuminates, lights up or otherwise highlights the symbol display member 104 connected to the support. The illumination device may be a Light Emitting Diode (L.E.D.) or any other suitable light or suitable illumination device. In this embodiment, each of the display member supports 130 includes three circuit board members 131. The circuit board members 131 are connected together as shown in FIG. 3F and control the illumination of the illumination devices. In one embodiment, one of the illumination devices illuminates one of the symbol display members when the pivoting symbol indicator 108 randomly indicates a symbol on the symbol display member. In another embodiment, at least one of the symbol display members 104 includes an illumination device. In one aspect of this embodiment, the symbol display member is illuminated when a symbol on that symbol display member is indicated by the pivoting symbol indicator as described above. In another aspect of this embodiment, all of the symbol display members are initially illuminated and the symbol display member including the indicated symbol becomes non-illuminated. It should be appreciated that one of the symbol display members, a plurality of the symbol display members or all of the symbol display members or any suitable combination of the symbol display members may be illuminated in a game.

In one embodiment, the pivoting symbol indicator 108 is positioned and mounted in the center of the symbol display mechanism 102 and includes an indicator member 134, where in this embodiment, the symbol indicator is in the form of a bird, to indicate symbol display members 104, which are in the form of coconuts. It should be appreciated that the symbol indicator 108 may be positioned and mounted outside of and adjacent to the symbol display mechanism 102. In one embodiment, the indicator member 134 includes a pointer 136, a pivot member 138 and a body 140, where the pivot member is attached to the pointer at one end and to the body at the opposite end. It should be appreciated that the pivoting symbol indicator 108, symbol display members 104 and other components in the game may be any suitable size or shape, or based on any theme or themes associated with the game.

Figure 5A:
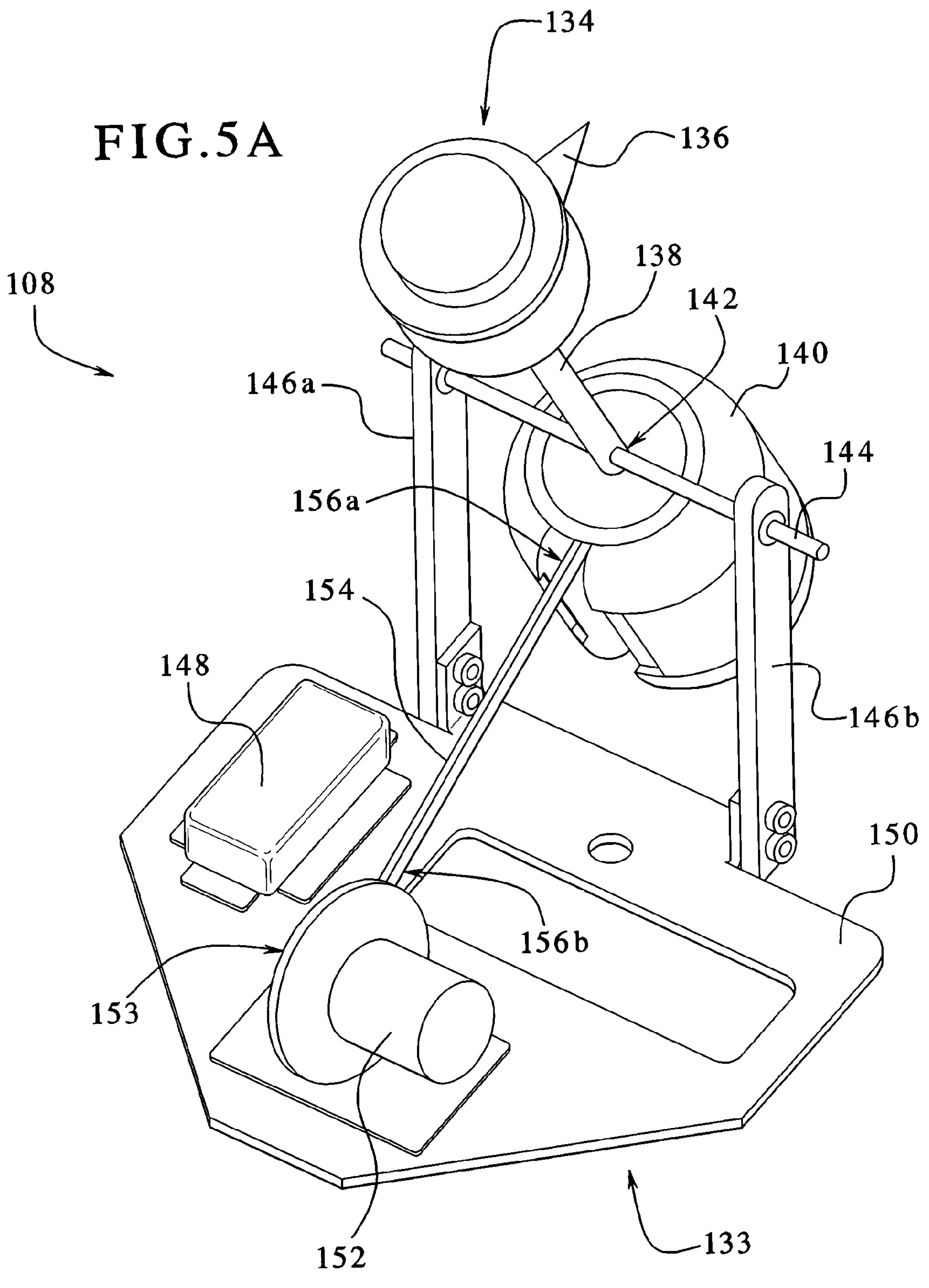
FIG. 5A is an enlarged perspective view of the pivoting symbol indicator of one embodiment of the present invention.

In this embodiment, the indicator member and specifically, the pivot member 138 defines a hole 142 which extends through the pivot member. A support such as axle 144 is inserted into the hole 142 and at least a portion of the axle transversely extends from each side of the pivot member as shown in FIG. 5A. The indicator member 134 is positioned between two vertical spaced-apart supports 146*a* and 146*b*, which are attached to and extend vertically from an assembly plate 150, which is connected to the bottom of the housing 101 using suitable connectors. The assembly plate 150 enables the pivoting symbol indicator 108 to be removed, replaced or repaired if necessary. Each end of the axle 124 is rotatable connected to one of the two vertical supports 146*a* and 146*b*, to enable the indicator member 134 to pivot generally forward and backward about the axle 144 to indicate a symbol 106 on one of the symbol display members 104. A symbol indicator wire assembly or connector interface 148 is secured to the assembly plate 150 and electrically connects to the main wire connector 135. The connector interface 148 enables the processor to communicate with the motor 152 via suitable wires shown in FIG. 5D to control the operation of the motor.

Figure 5B:
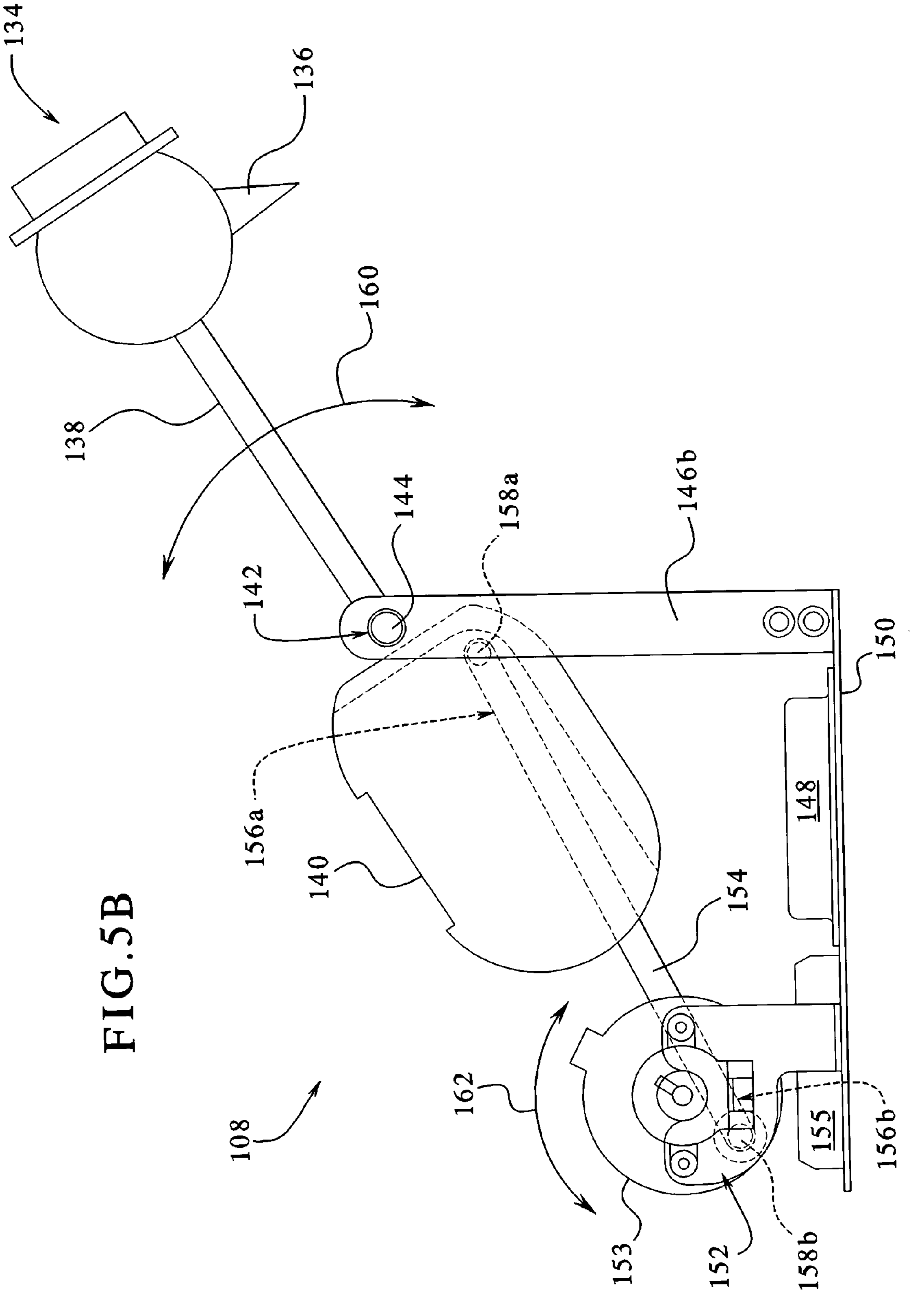
FIG. 5B is a side view of the embodiment of the pivoting symbol indicator of FIG. 5A where the symbol indicator is pivoted towards the bottom of the housing.
Figure 5C:
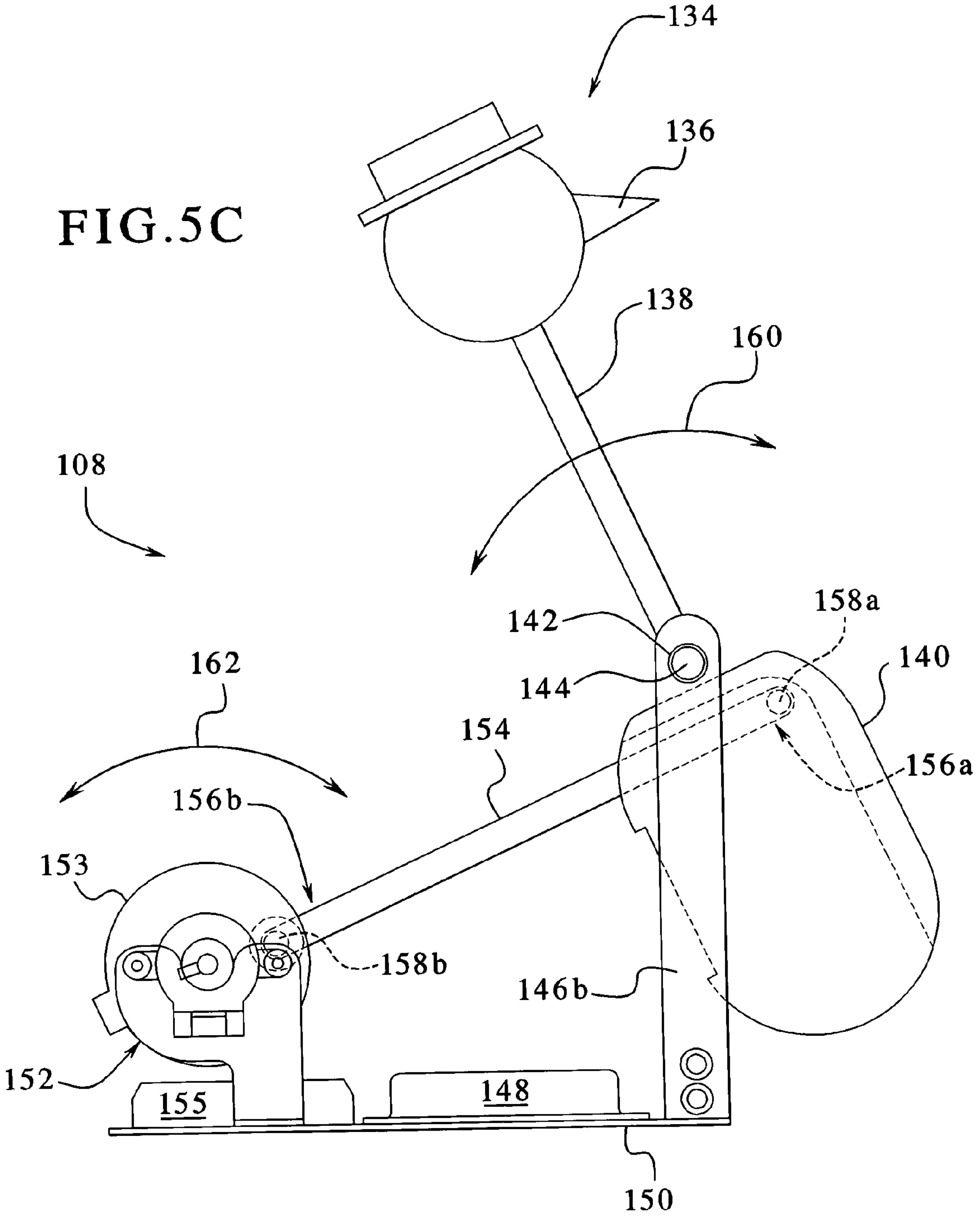
FIG. 5C is a side view of the embodiment of the symbol indicator of FIG. 5A where the symbol indicator is pivoted away from the bottom of the housing.
Figure 5D:
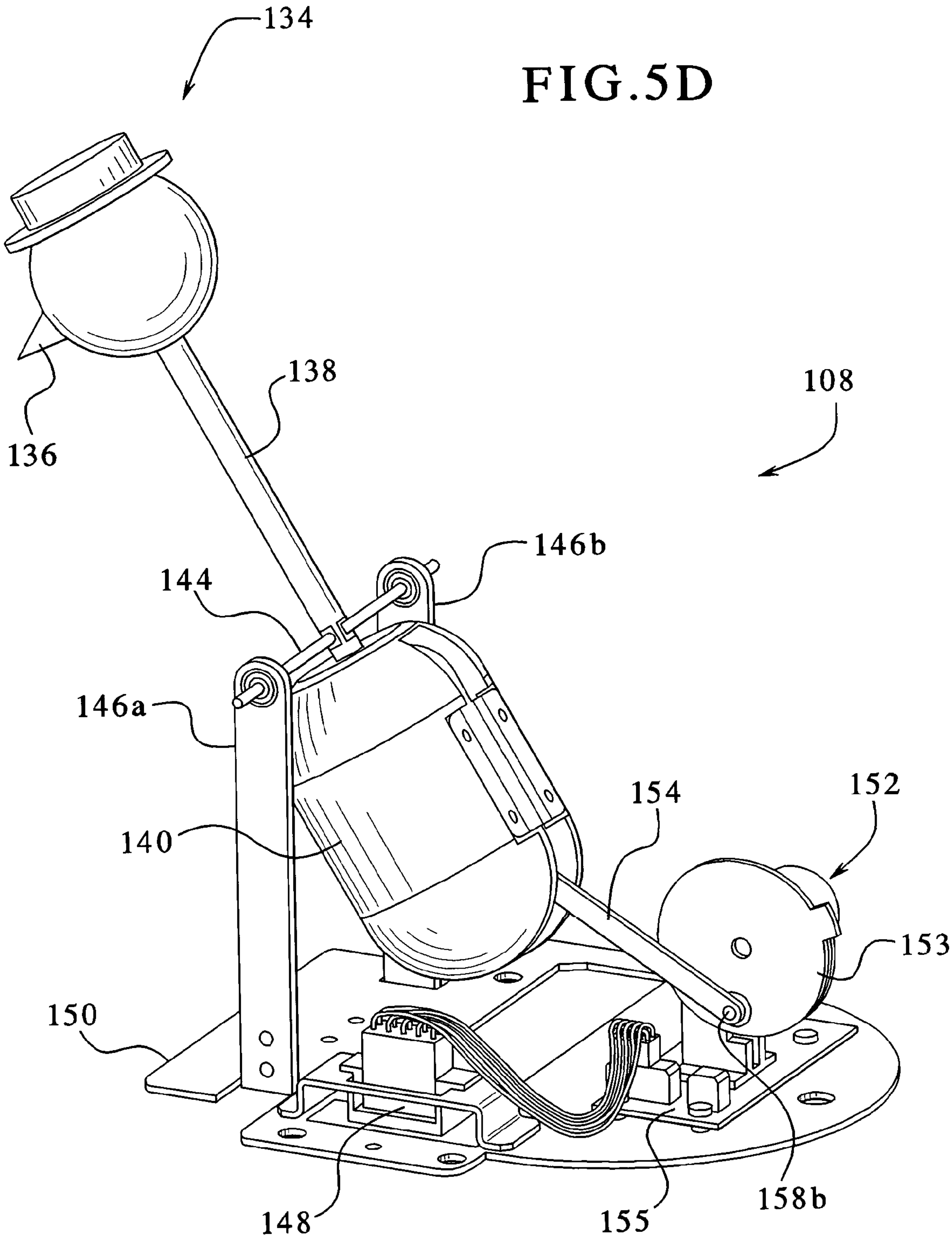
FIG. 5D is an enlarged side perspective view of the pivoting symbol indicator of FIG. 5A.

In one embodiment, a lever arm or arm 154 is rotatably connected to the center portion of the rear side of the indicator member 134 at a first end 156*a* using a suitable connector such as a lockable pin 158*a* and connected to a motor plate 153 actuator such as an electric motor 152 at a second end 158*b* as shown in FIGS. 5A, 5B and 5C. It should be appreciated that the motor may be any suitable actuator or motor. In one embodiment, the motor 152 includes a motor plate 153 which is connected to and rotated by the motor. The second end 156*b* of the lever arm is 154 attached to the motor plate 153 using a suitable attachment device or method. In one embodiment, the connection of the first and second ends of the lever arm 154 are in substantially the same plane to efficiently transfer the force generated by the motor 152 to and from the indicator member 134. As further described below, the rotation of the motor plate 136 causes the lever arm 154 to pivot or otherwise move the indicator member 134 towards one of the symbol display members 106 or away from the symbol display members 106. It should be appreciated that the lever arm 154 may also be connected directly to the motor 152 using a suitable connector or connectors.

In one embodiment, the indicator member 134 is initially displayed in a substantially vertical position. To indicate one of the symbols 106 on one of the symbol display members 104, the processor communicates with the motor 152 via the connector interfaces 148 and 155 and causes the motor to rotate the motor plate 153 in a clockwise direction. The clockwise rotation of the motor plate 153 pulls the second end 158*b* of the lever arm 154 downward and backward away from the indicator member 134, which causes the first end 158*a* of the lever arm 134 to pivot the symbol indicator 108 downward towards one of the symbol display members 104 to indicate a symbol on that symbol display member.

To pivot the indicator member 134 away from the symbol display members 104, the processor communicates with the motor 152 via the connector interfaces 148 and 155 and causes the motor to rotate the motor plate 153 in a counter-clockwise direction. The counter-clockwise rotation of the motor plate 153 pushes the second end 156*b* of the lever arm 154 towards the indicator member 134, which causes the first end 156*a* of the lever arm to pivot the indicator member 134 upward and away from the symbol display member or members 104. It should be appreciated that the motor may rotate the motor plate in a clockwise direction, a counterclockwise direction or any suitable combination of directions to cause the indicator member to pivot in any suitable combination of directions.

In one embodiment, the symbol indicator 108 includes a shield or shielding member (not shown), which is positioned in front of the symbol indicator and connected to the symbol display mechanism 102 to obscure or prevent a player from viewing the mechanical components of the symbols indicator member. In one embodiment, the shield includes a slot or elongated opening which enables the pivoting symbol indicator 108 to pivot forward or away from the symbol display members similar to the indicator base shown in FIGS. 7B and 7C. It should be appreciated that the shield may be any suitable shape and manufactured using any suitable material.

Figure 6A:
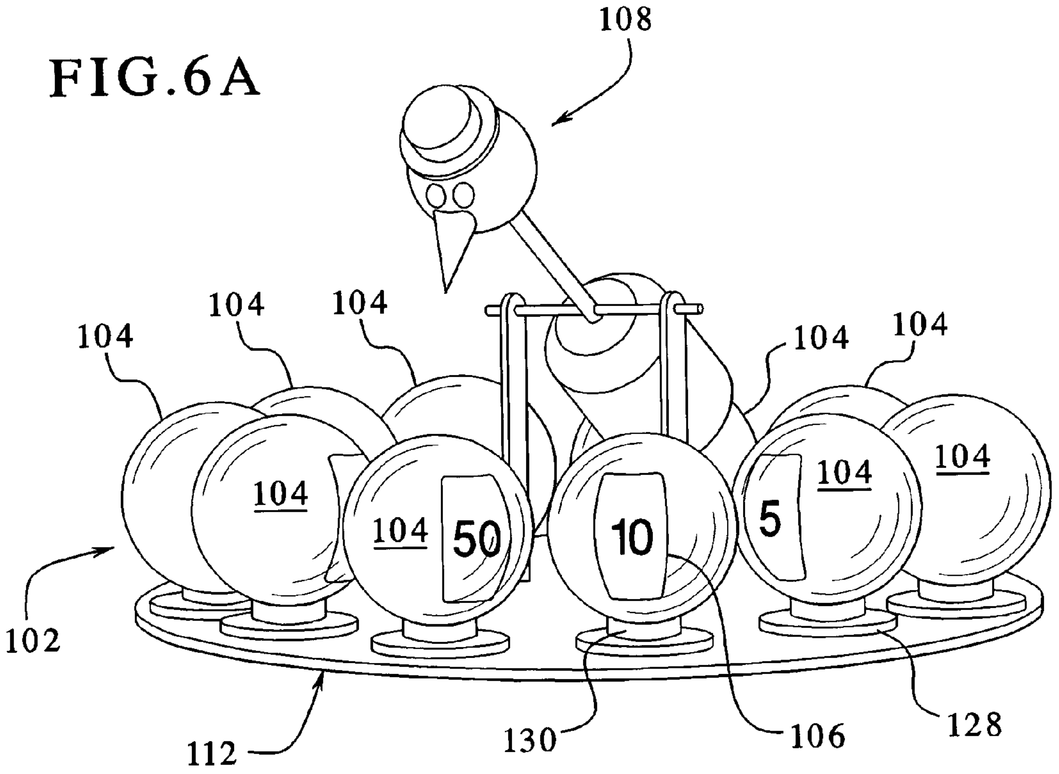
FIGS. 6A and 6B are enlarged perspective views of the embodiment of FIG. 1 illustrating an example of a symbol being indicated by the pivoting symbol indicator in a game.
Figure 6B:
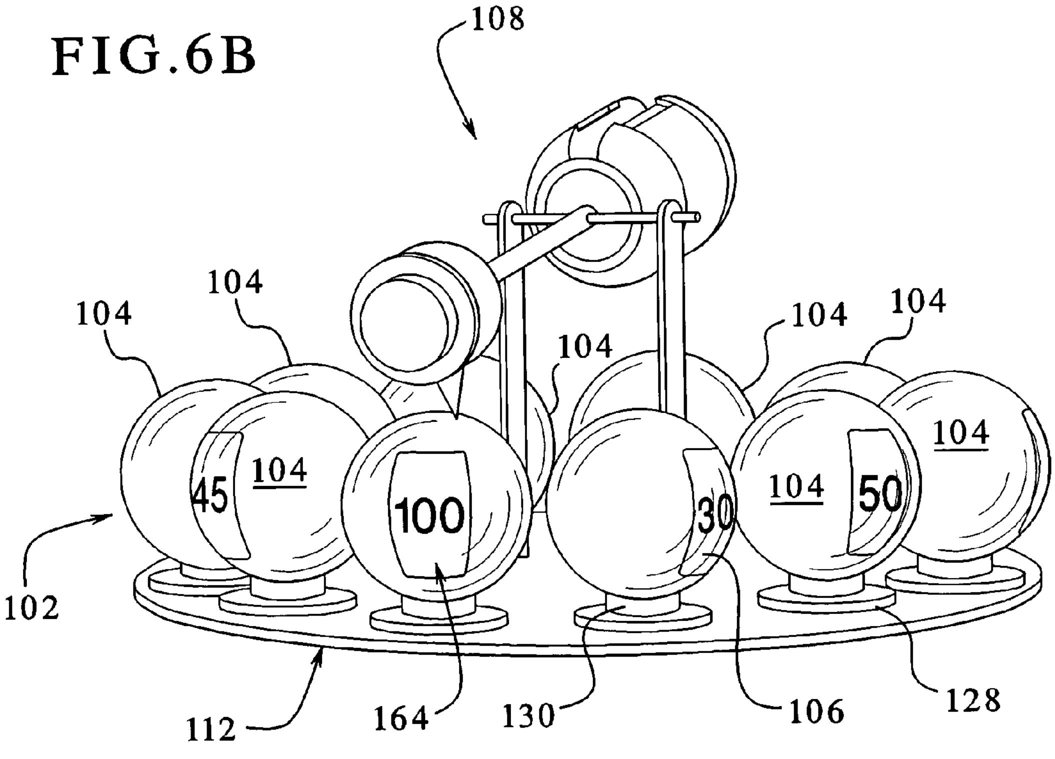

Referring to FIGS. 6A and 6B, in one example, the symbol display members 104 include two symbols 138*a* and 138*b*, which are spaced apart on each of the symbol display members 104. In this example, the symbols represent numbers or values. However, it should be appreciated that the symbols may represent values, prizes, game elements, free spins, free games, modifiers, any suitable type of award or any suitable combination of these awards. The second gears 128 attached to each of symbol display members 104 are sized so that each of the symbol display members rotate three and one half times for each single rotation of the base plate 113*a*. Therefore, when the base plate 113*a* makes one revolution or rotation in a game, each of the symbol display members 104 rotate three and one half times. The symbols 106 included on each of the symbol display members are therefore spaced apart so that at least one of the symbols is viewable by the player when the symbol display member is rotated into the viewable section or area 110 of the housing 101.

In one embodiment, as the plate assembly 112 and symbol display members 104 rotate, the processor randomly selects one of the symbols on the symbol display members to indicate in the game. The processor then communicates with the motor 152 to rotate the motor plate 153 in a clockwise direction as described above, to cause the indicator member 134 to pivot towards the symbol display members 104 and indicate the selected symbol on the symbol display member 104 when the symbol display member is positioned in front of the pivoting symbol indicator 108. The symbol indicator 108 pivots until it is adjacent to or contacts and indicates the selected symbol 164 on the symbol display member. At this point, the rotation of the base plate 113*a* and each of the symbol display members 104 stops and the indicated symbol 164 (i.e., the symbol that is viewable by the player and indicated by the indicator member) is provided to the player in the game. In this example, the symbols represent award values or values such as the value one hundred which is associated with the indicated symbol 164 and provided to the player in the game. As described above, the indicated symbol display member 104 may also become illuminated or lit up when the symbol indicator pivots to indicate the symbol on that symbol display member.

Referring now to FIGS. 7A to 7D, an alternative embodiment of the present invention is illustrated where the gaming device includes a secondary display device 200. The secondary display device 200 includes the symbol display mechanism 102 as described above, a plurality of symbol display members 202 are movably connected to the plate assembly 112 of the symbol display mechanism 102, and a pivoting symbol indicator 206. In this embodiment, the plate assembly 112 is the same plate assembly described above which includes the base plate 113*a* having a plate support 114 which is rotatably connected to the housing 101.

Figure 7A:
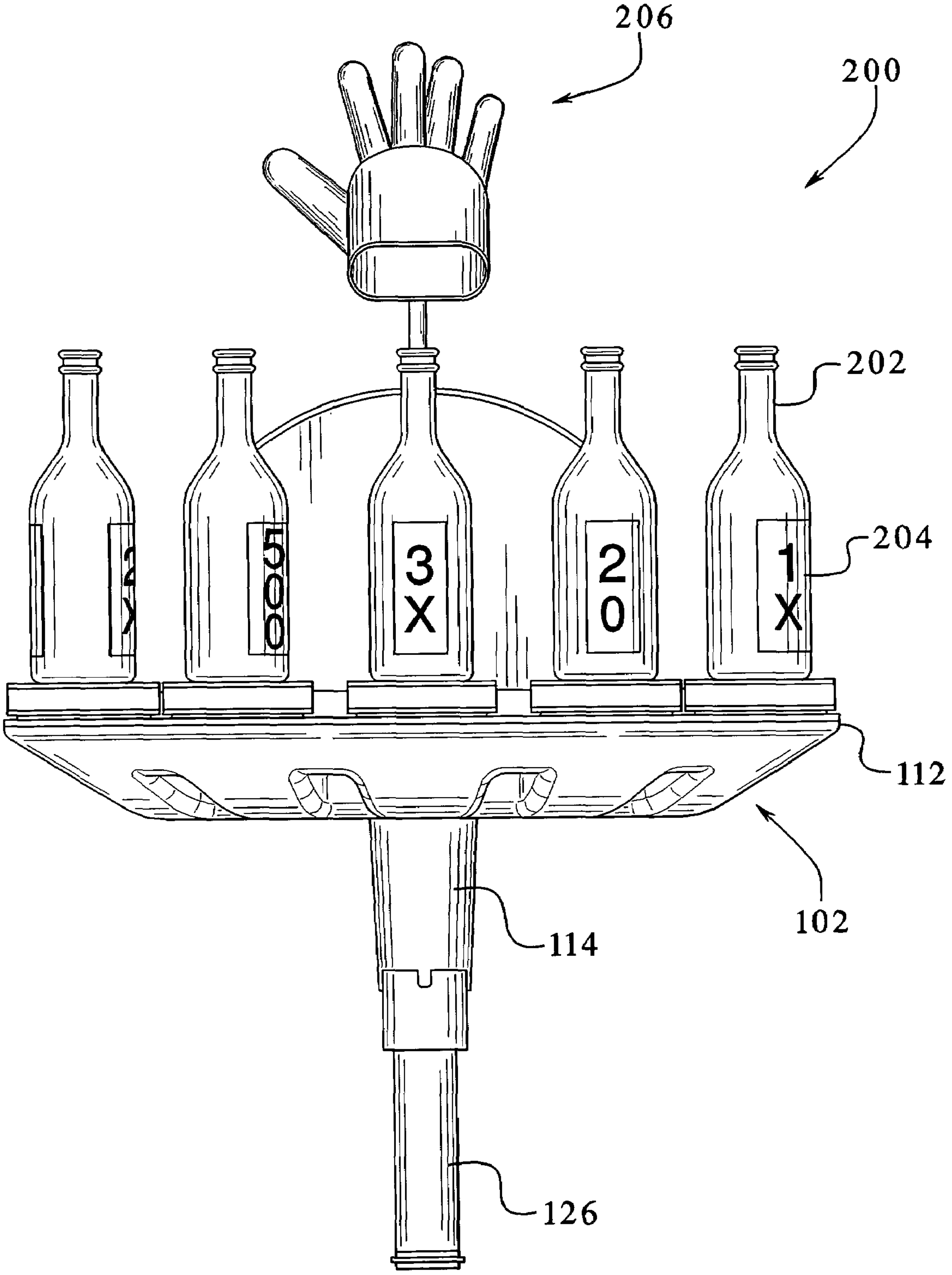
FIG. 7A is an enlarged perspective view of another embodiment of the present invention illustrating a pivoting symbol indicator, which is in the form of a hand, that indicates a symbol on one of a plurality of moving symbol display members, which are in the form of bottles.

In this embodiment, the symbol display members 202 are movably connected to the plate assembly 112 as described above. However, the symbol display members 202 are in the form of bottles which rotate with respect to the base plate 113*a*. In this embodiment, the bottles each include at least two symbols 204 which may be two values, two multipliers or a value and a multiplier. In one embodiment, at least one of the symbols 204 includes a multiplier. The bottles 202 rotate as described above in a game. The pivoting symbol indicator 206 is in the form of a glove as shown in FIG. 7A. As described above, the pivoting symbol indicator 206 is connected to and secured to the center portion or area of the base plate 113*a* and pivots upward and downward to indicate one of the symbols on one of the symbol display members 202. In this embodiment, the symbol indicator 206 or glove pivots toward and contacts or at least moves adjacent to one of the bottles 202 on the base plate 113*a*. The symbol indicator thereby indicates one of the symbols 204 on the indicated bottle 202. The value or multiplier associated with the symbol 204 on the indicated bottle 202 is provided to the player in a game.

In one embodiment, the pivoting symbol indicator 206 includes an indicator member 208 and an indicator base 210. In this embodiment, the indicator member 208 is connected to an indicator arm 209. The indicator arm 209 enables the indicator member 208 to pivot toward and away from each of the bottles 202. To enable the indicator member to pivot, the indicator arm defines an opening which receives an axle 211. The axle is suitably sized to extend from each side of the indicator arm 209 and enable each end of the axle to fit into corresponding holes on indicator support 212. The indicator support 212 is connected to the indicator base 210 and supports the indicator member relatively to the base.

In one embodiment, to control the pivoting action of the indicator member 208, a drive mechanism 218 is connected to the indicator member assembly. The drive mechanism 218 includes a pivot arm 214 which is connected to and substantially parallel to the indicator arm 209, a lever arm 216 which is connected at one end to the pivot arm 214 and at another end to the motor 219. As described above, the motor 219 controls the movement of the lever arm 216 which controls the movement of the indicator member 208.

In one embodiment, the pivot arm 214 is secured to or connected to the indicator arm 209. The lever arm 216 is connected to the pivot arm 214 at one end using a suitable connector or connectors. The lever arm is also connected to the motor plate 220 using a suitable connector 222*b*. The motor plate 220 rotates with respect to the motor 219 and the movement of the motor plate is controlled by the motor. Therefore, the motor 219 rotates the motor plate 220 in a clockwise or counter-clockwise direction to control the movement of the indicator member 208. When the motor plate 220 rotates in a counter-clockwise direction, the motor plate pulls the lever arm 216 backward away from the indicator base 210 and pivots the indicator member 208 towards one of the bottles 202. To pivot the indicator member 208 upward or away from a bottle 202, the motor causes the motor plate 220 to rotate in a clockwise direction which pushes or directs the lever arm 216 towards the indicator base 210 and pivots the indicator member 208 upwards. It should be appreciated that the motor 219 may cause the motor plate 220 to rotate in a clockwise direction, a counter-clockwise direction or in any suitable combination of directions.

Figure 7B:
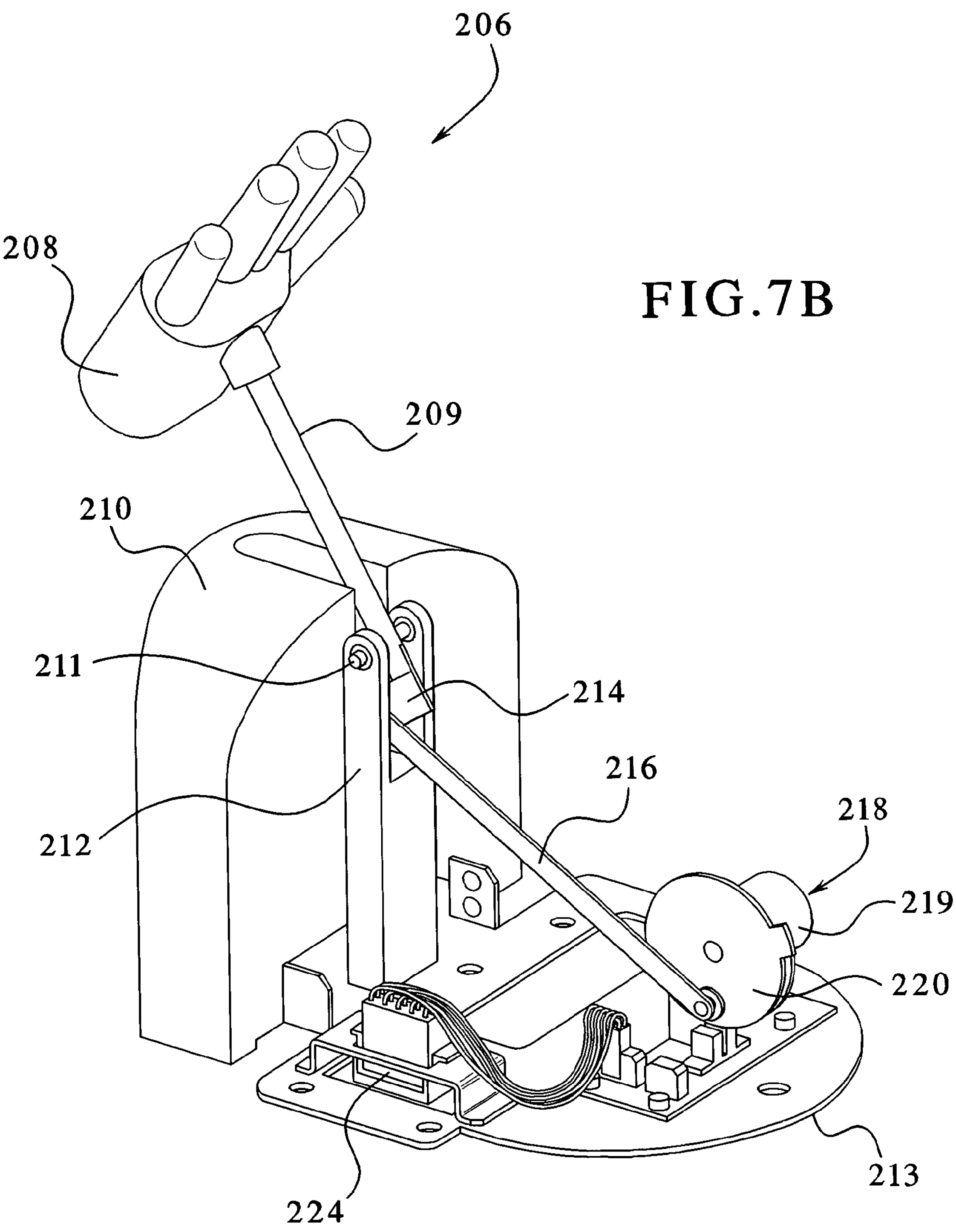
FIG. 7B is an enlarged side perspective view of the pivoting symbol indicator of the embodiment of FIG. 7A.
Figure 7C:
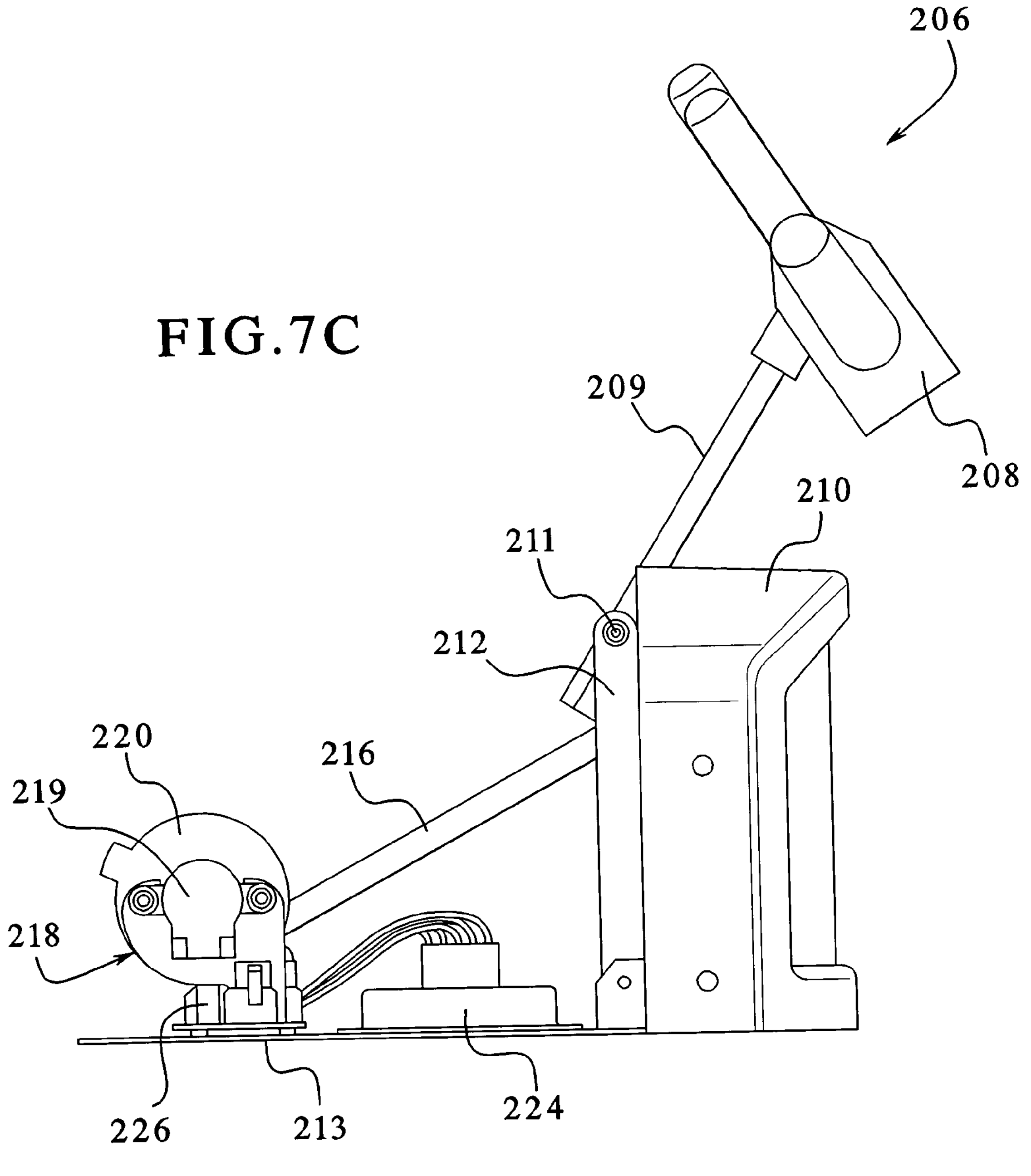
FIG. 7C is a side view of the pivoting symbol indicator of the embodiment of FIG. 7A.
Figure 7D:
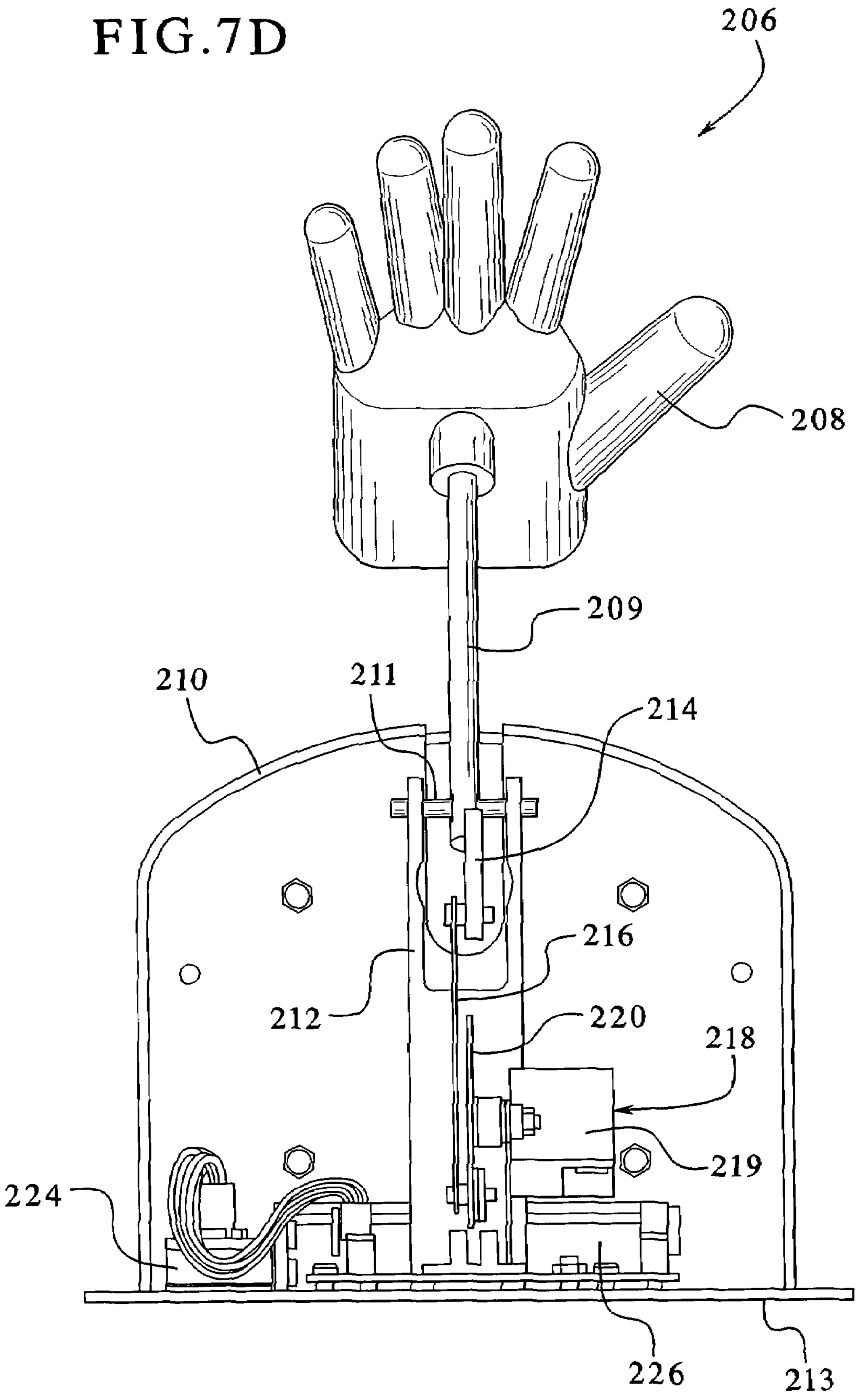
FIG. 7D is a rear view of the pivoting symbol indicator of the embodiment of FIG. 7A.

The indicator base 210 and the motor 219 are mounted to a base plate 213. The base plate is positioned in the center of the plate assembly 112 and is mounted to the plate assembly using suitable connectors or fasteners. In one embodiment, a main circuit board or connector interface 224 connects to a corresponding electrical connector on the symbol display mechanism 202 to communicate electrical signals from the processor to the main connector interface 224. The main connector interface 224 then communicates the electrical signals to a motor circuit board 226 using suitable wiring as shown in FIG. 7B. The motor circuit board 226 sends the electrical signals to the motor 219 to cause the motor to rotate the motor plate 220. Therefore, the processor communicates or delivers electrical signals through the main connector interface 224 and the motor circuit board 226 to control the movement of the indicator member 208 in a game.

In one example of a game employing the alternative embodiment of the mechanical display device 200 shown in FIG. 7A, the symbols 204 on the bottle 202 include a plurality of values and at least one multiplier. In the game, the symbol display mechanism 102 and each of the bottles 202 rotate upon a triggering event in a game. The symbol indicator 206 pivots and indicates a symbol 204 on one of the bottles 202. The gaming device accumulates any multipliers indicated by the pivoting symbol indicator 206. When the symbol indicator 206 indicates a symbol including a value, the game ends and the value is multiplied by the accumulated multiplier in the game to provide a total award to the player in the game. In one embodiment, the gaming device provides a fixed or predetermined award to the player when a designated accumulated total multiplier value is achieved in the game. For example, the gaming device provides the player with an award of five hundred when a player accumulates a total multiplier value of 10× before a non-multiplier value is indicated in the game.

It should be appreciated that the pivoting symbol indicator display device of the present invention may be employed in a primary game, secondary game or any other suitable game associated with the gaming device.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

a game operable upon a wager by a player;

a cabinet;

a housing connected to the cabinet;

a symbol display mechanism including a plate rotatably attached to the housing and a plurality of symbol display members each independently rotatably attached to the plate, each of said symbol display members including at least one symbol and at least one of said symbol display members including a plurality of symbols, wherein at least one of the symbols on the symbol display members is adapted to be indicated after a triggering event;

a pivotable symbol indicator positioned adjacent to the symbol display mechanism and attached to the housing, wherein the symbol indicator is operable to pivot towards and away from the plate to indicate at least one of the symbols of the symbol display members; and an award adapted to be provided to a player, wherein the award is based on the indicated symbol.

2. The gaming device of claim 1, wherein at least a portion of the housing includes a substantially transparent material.

3. The gaming device of claim 1, wherein the symbol display mechanism includes a support having a first end and a second end, said first end being attached to the plate and said second end being movably connected to the housing.

4. The gaming device of claim 3, which includes an actuator coupled with the second end of the support.

5. The gaming device of claim 1, which includes a first gear positioned adjacent to the plate and attached to the frame, and a plurality of second gears, each of said second gears attached to one of the symbol display members, wherein the first gear is meshed with each of the second gears and causes the second gears to rotate relative to the first gear.

6. The gaming device of claim 5, wherein the ratio of the number of revolutions of each of the second gears to the number of revolutions of the first gear is greater than 1 to 1.

7. The gaming device of claim 5, wherein the ratio of the number of revolutions of each of the second gears to the number of revolutions of the first gear is 3.5 to 1.

8. The gaming device of claim 1, wherein one of the symbol display members includes at least one illumination device.

9. The gaming device of claim 1, wherein a plurality of the symbol display members include at least one illumination device.

10. The gaming device of claim 1, wherein all of the symbol display members each include at least one illumination device.

11. The gaming device of claim 1, wherein at least two of the symbols on each of the symbol display members are different.

12. The gaming device of claim 1, wherein a plurality of the symbols on each of the symbol display members are different.

13. The gaming device of claim 1, wherein all of the symbols on each of the symbol display members are different.

14. The gaming device of claim 1, wherein the symbols represent an outcome of at least one of the group consisting of; a game element, an award, a free spin, a free game and a modifier.

15. The gaming device of claim 1, wherein the symbol indicator includes an indicator member, a lever arm and an actuator, said lever arm is connected to the indicator member at a first end and to an actuator at a second end, said actuator being operable to move the lever arm and cause the indicator member to pivot.

16. The gaming device of claim 15, wherein the connections of the first end and the second end of the lever arm is in substantially the same plane.

17. The gaming device of claim 1, which includes a slip disk having a fixed member and a moveable member, wherein the fixed member is connected to the symbol indicator and the moveable member is connected to symbol display mechanism, and wherein the slip disk is operable to facilitate the transfer of electrical signals to the symbol indicator and the symbol display mechanism to control the movement of the symbol indicator and the symbol display mechanism.

18. The gaming device of claim 1, wherein the symbol indicator includes an indicator member and a pivot member having a first end and a second end, wherein said first end of the pivot member is connected to the indicator member and the second end of the pivot member is connected to a body.

19. The gaming device of claim 18, which includes a substantially horizontal axle extending through and connecting to an opening defined in the pivot member, each of said ends of said pivot member are connected to substantially vertical spaced apart axle supports, wherein the axle supports are connected to the housing, and wherein the symbol indicator pivots about the axis defined by the axle toward and away from one of the symbol display members.

20. A gaming device comprising:

a game operable upon a wager by a player;

a cabinet;

a housing connected to the cabinet;

a symbol display mechanism including a support rotatably attached to the housing and a plurality of symbol display members each independently rotatably attached to the support, wherein each of said symbol display members includes at least one symbol and at least one of said symbol display members includes a plurality of symbols;

a pivotable symbol indicator positioned adjacent to the symbol display mechanism and attached to the housing, wherein upon the occurrence of a triggering event associated with the game, the symbol display mechanism and each of the symbol display members independently move and the symbol indicator pivots toward the support and adjacent to one of the symbol display member to indicate one of the symbols on said symbol display members; and an award adapted to be provided to a player, wherein the award is based on the indicated symbol.

21. The gaming device of claim 20, wherein at least a portion of the housing includes a substantially transparent material.

22. The gaming device of claim 20, wherein the symbol display mechanism includes a plate and a support having a first end and a second end, said first end being attached to the plate and said second end being movably connected to the housing.

23. The gaming device of claim 22, which includes an actuator coupled with the second end of the support.

24. The gaming device of claim 20, which includes a first gear positioned adjacent to the symbol display mechanism and attached to the frame, and a plurality of second gears, each of said second gears attached to one of the symbol display members, wherein the first gear is meshed with each of the second gears and causes the second gears to rotate relative to the first gear.

25. The gaming device of claim 24, wherein the ratio of the number of revolutions of each of the second gears to the number of revolutions of the first gear is greater than 1 to 1.

26. The gaming device of claim 24, wherein the ratio of the number of revolutions of each of the second gears to the number of revolutions of the first gear is 3.5 to 1.

27. The gaming device of claim 20, wherein one of the symbol display members includes at least one illumination device.

28. The gaming device of claim 20, wherein a plurality of the symbol display members include at least one illumination device.

29. The gaming device of claim 20, wherein all of the symbol display members each include at least one illumination device.

30. The gaming device of claim 20, wherein at least two of the symbols on each of the symbol display members are different.

31. The gaming device of claim 20, wherein a plurality of the symbols on each of the symbol display members are different.

32. The gaming device of claim 20, wherein all of the symbols on each of the symbol display members are different.

33. The gaming device of claim 20, wherein the symbols represent an outcome of at least one of the group consisting of: a game element, an award, a free spin, a free game and a modifier.

34. The gaming device of claim 20, wherein the symbol indicator includes an indicator member, a lever arm and an actuator, said lever arm is connected to the indicator member at a first end and to an actuator at a second end, said actuator being operable to move the lever arm and cause the indicator member to pivot.

35. The gaming device of claim 34, wherein the connections of the first end and the second end of the lever arm is in substantially the same plane.

36. The gaming device of claim 20, which includes a slip disk having a fixed member and a moveable member, wherein the fixed member is connected to the symbol indicator and the moveable member is connected to symbol display mechanism, and wherein the slip disk is operable to facilitate the transfer of electrical signals to the symbol indicator and the symbol display mechanism to control the movement of the symbol indicator and the symbol display mechanism.

37. A gaming device comprising:

a game operable upon a wager by a player;

a cabinet;

a housing connected to the cabinet;

a symbol display mechanism including a support rotatably attached to the housing and a plurality of symbol display members each independently rotatably attached to the support, wherein each of said symbol display members includes at least one symbol and at least one of said symbol display members includes a plurality of symbols;

a pivotable symbol indicator positioned adjacent to the symbol display mechanism and attached to the housing, said symbol indicator being pivotable towards and away from the support and the symbol display members; and a processor operable to cause the symbol display mechanism to rotate relative to the housing, each of the symbol display members to independently rotate relative to the symbol display mechanism, the symbol indicator to pivot towards one of the symbol display members to indicate one of the symbols on the symbol display member after the occurrence of a triggering event associated with the game and provide an award to a player based on the indicated symbol.

38. The gaming device of claim 37, wherein at least a portion of the housing includes a substantially transparent material.

39. The gaming device of claim 37, wherein the symbol display mechanism includes a support having a first end and a second end, said first end being attached to the plate and said second end being rotatably connected to the housing.

40. The gaming device of claim 39, which includes an actuator coupled with the second end of the support.

41. The gaming device of claim 37, which includes a first gear positioned adjacent to the symbol display mechanism and attached to the frame, and a plurality of second gears, each of said second gears attached to one of the symbol display members, wherein the first gear is meshed with each of the second gears and causes the second gears to rotate relative to the first gear.

42. The gaming device of claim 41, wherein the ratio of the number of revolutions of each of the second gears to the number of revolutions of the first gear is greater than 1 to 1.

43. The gaming device of claim 41, wherein the ratio of the number of revolutions of each of the second gears to the number of revolutions of the first gear is 3.5 to 1.

44. The gaming device of claim 37, wherein one of the symbol display members includes at least one illumination device.

45. The gaming device of claim 37, wherein a plurality of the symbol display members include at least one illumination device.

46. The gaming device of claim 37, wherein all of the symbol display members each include at least one illumination device.

47. The gaming device of claim 37, wherein at least two of the symbols on each of the symbol display members are different.

48. The gaming device of claim 37, wherein a plurality of the symbols on each of the symbol display members are different.

49. The gaming device of claim 37, wherein all of the symbols on each of the symbol display members are different.

50. The gaming device of claim 37, wherein the symbols represent an outcome of at least one of the group consisting of: a game element, an award, a free spin, a free game and a modifier.

51. The gaming device of claim 37, wherein the symbol indicator includes an indicator member, a lever arm and an actuator, said lever arm is connected to the indicator member at a first end and to an actuator at a second end, said actuator being operable to move the lever arm and cause the indicator member to move.

52. The gaming device of claim 51, wherein the connections of the first end and the second end of the lever arm is in substantially the same plane.

53. The gaming device of claim 37, which includes a slip disk having a fixed member and a moveable member, wherein the fixed member is connected to the symbol indicator and the moveable member is connected to symbol display mechanism, and wherein the slip disk is operable to facilitate the transfer of electrical signals to the symbol indicator and the symbol display mechanism from the processor to control the movement of the symbol indicator and the symbol display mechanism.

54. A method of operating a mechanical display device including a housing, a rotatable symbol display mechanism connected to the housing, a plurality of symbol display members independently rotatably connected to the symbol display mechanism, each of the symbol display members including at least one symbol and at least one of said symbol display members including a plurality of symbols, the symbols including a plurality of non-multiplier values and at least one multiplier, and a pivoting symbol indicator connected to the symbol display mechanism which is operable to pivot toward the symbol display mechanism and toward at least one of the symbol display members to indicate one of the symbols on the symbol display member, wherein the mechanical display device is operated in conjunction with a game, the method comprising:

(a) rotating the symbol display mechanism and each of the symbol display members after a triggering event associated with the game;

(b) indicating one of the symbols on one of the symbol display members by pivoting said symbol indicator towards said symbol display mechanism and said symbol display member;

(c) accumulating the value of any multipliers associated with the symbol on the indicated symbol display member;

(d) repeating steps (a) to (c) until a non-multiplier value is associated with the symbol on the indicated symbol display member; and (e) providing an award to a player, wherein the award is the product of the accumulated multiplier and the non-multiplier value.

55. The method of claim 54, which includes the step of providing the award to the player when a designated accumulated multiplier value is achieved before one of the symbols including a non-multiplier value is indicated in the game.

* * * * *

UNITED STATES PATENT AND TRADEMARK OFFICE

CERTIFICATE OF CORRECTION

PATENT NO. : 7,241,220 B2
APPLICATION NO. : 10/660401
DATED : July 10, 2007
INVENTOR(S) : Markus Rothkranz et al.

It is certified that error appears in the above-identified patent and that said Letters Patent is hereby corrected as shown below:

In column 4, Line 15 change “Sifting” to --sitting--.

Signed and Sealed this

Twenty-fifth Day of December, 2007

JON W. DUDAS
*Director of the United States Patent and Trademark Office*